US012736779B2

(12) United States Patent
Chae

(10) Patent No.: US 12,736,779 B2
(45) Date of Patent: Sep. 15, 2026

(54) IMAGING LENS SYSTEM

(71) Applicant: SAMSUNG ELECTRO-MECHANICS CO., LTD., Suwon-si (KR)

(72) Inventor: Kyu Min Chae, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 296 days.

(21) Appl. No.: 18/417,828

(22) Filed: Jan. 19, 2024

(65) Prior Publication Data

US 2024/0345369 A1 Oct. 17, 2024

(30) Foreign Application Priority Data

Apr. 12, 2023 (KR) ........................ 10-2023-0048235

(51) Int. Cl.
*G02B 13/00* (2006.01)
*G02B 7/02* (2021.01)
*G02B 9/64* (2006.01)

(52) U.S. Cl.
CPC ......... *G02B 13/0045* (2013.01); *G02B 7/028* (2013.01); *G02B 9/64* (2013.01)

(58) Field of Classification Search
CPC ....... G02B 13/0045; G02B 7/028; G02B 9/64
USPC .......................................................... 359/708
See application file for complete search history.

(56) References Cited

U.S. PATENT DOCUMENTS 6,081,384 A 6/2000 Mori
2019/0094495 A1 3/2019 Amano et al.
2019/0235196 A1* 8/2019 Hong ..................... G02B 7/028
2019/0258028 A1* 8/2019 Huang ................... H04N 23/55
2020/0400922 A1* 12/2020 Hirano ................... H04N 23/55
2021/0149164 A1* 5/2021 Feng ...................... G02B 13/02
2022/0099932 A1 3/2022 Wang
2022/0206256 A1* 6/2022 Chen .................. G02B 13/0045
2025/0138273 A1* 5/2025 Chae .................. G02B 13/0045

FOREIGN PATENT DOCUMENTS

CN 211627919 U 10/2020
CN 114624861 A 6/2022
CN 115480379 A 12/2022
JP 2019-060972 A 4/2019
JP 2022-56303 A 4/2022
KR 10-1838561 B1 3/2018

OTHER PUBLICATIONS

Korean Office Action Issued on Feb. 3, 2025, in Counterpart Korean Patent Application No. 10-2023-0048235 (5 Pages in English, 4 Pages in Korean).
Taiwanese Office Action Issued on Jun. 12, 2026, in Counterpart Taiwanese Patent Application No. 113101753 (9 Pages in English, 8 Pages in Chinese).

* cited by examiner

*Primary Examiner* — Stephone B Allen
*Assistant Examiner* — Leonidas Boutsikaris
(74) *Attorney, Agent, or Firm* — NSIP Law

(57) ABSTRACT

An imaging lens system includes a first lens, a second lens, a third lens, a fourth lens, a fifth lens, a sixth lens, a seventh lens, and an eighth lens, sequentially arranged from an object side. Each of the second lens and the third lens has a positive refractive power. The imaging lens system satisfies conditional expression: $|L3DTn|<10.0$ [$10^{-6}$/° C.], where L3DTn is a change rate in refractive index according to a change in temperature of the third lens.

19 Claims, 24 Drawing Sheets

IMAGING LENS SYSTEM

CROSS-REFERENCE TO RELATED APPLICATIONS

This application claims the benefit under 35 USC 119 (a) of Korean Patent Application No. 10-2023-0048235 filed on Apr. 12, 2023, in the Korean Intellectual Property Office, the entire disclosure of which is incorporated herein by reference for all purposes.

1. FIELD

The present disclosure relates to an imaging lens system.

2. DESCRIPTION OF THE BACKGROUND

A small surveillance camera may be configured to capture image information of a surveillance zone. For example, the small surveillance camera may be mounted on a front bumper, a rear bumper, or the like of a vehicle and may provide a captured image to a driver.

Early small surveillance cameras were designed to capture an image of an obstacle adjacent to a vehicle, and thus not only have relatively low resolution but also have a high change in resolution according to a change in temperature between −40 and 80° C. However, as the autonomous driving function of the vehicle is increasingly desired, a surveillance camera with high resolution and constant optical characteristics even under harsh temperature conditions may be beneficial.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an imaging lens system includes a first lens, a second lens, a third lens, a fourth lens, a fifth lens, a sixth lens, a seventh lens, and an eighth lens, sequentially arranged from an object side. Each of the second lens and the third lens has a positive refractive power. The imaging lens system satisfies conditional expression: $|L3DTn|<10.0\ [10^{-6}/°\ C.]$, where L3DTn is a change rate in refractive index according to a change in temperature of the third lens.

The imaging lens system may satisfy conditional expression: $f3/f<1.30$, where f is a focal length of the imaging lens system, and f3 is a focal length of the third lens.

The first lens may include a concave image-side surface.

The second lens may include a convex image-side surface.

The third lens may include a convex image-side surface.

The fourth lens may include a concave image-side surface.

The fifth lens may include a convex image-side surface.

The sixth lens may include a concave image-side surface.

The seventh lens may include a convex object-side surface.

The eighth lens may include a convex object-side surface.

In one or more general aspect, an imaging lens system includes a first lens, a second lens, a third lens, a fourth lens, a fifth lens, a sixth lens, a seventh lens, and an eighth lens, sequentially arranged from an object side. The second lens has a convex image-side surface. The imaging lens system satisfies conditional expression: $1.16<f3/f<1.26$, where f is a focal length of the imaging lens system, and f3 is a focal length of the third lens.

The imaging lens system may satisfy the conditional expression: $-1.0<f1/f3<-0.60$, where f1 is a focal length of the first lens.

The imaging lens system may satisfy the conditional expression: $1.80<f2/f3<2.60$, where f2 is a focal length of the second lens.

The imaging lens system may satisfy the conditional expression: $-5.0<(f1+f2)/(f3+f4)<-2.0$, where f1 is a focal length of the first lens, f2 is a focal length of the second lens, and f4 is a focal length of the fourth lens.

The imaging lens system may satisfy the conditional expression: $0.42<L1DTn/L3DTn<0.52$, where L1DTn is a change rate in refractive index according to a change in temperature of the first lens, and L3DTn is a change rate in refractive index according to a change in temperature of the third lens.

The imaging lens system may satisfy the conditional expression: $0.92<(L4DTn+L5DTn)/(L6DTn+L7DTn)<1.20$, where L4DTn is a change rate in refractive index according to a change in temperature of the fourth lens, L5DTn is a change rate in refractive index according to a change in temperature of the fifth lens, L6DTn is a change rate in refractive index according to a change in temperature of the sixth lens, and L7DTn is a change rate in refractive index according to a change in temperature of the seventh lens.

In another one or more general aspect, an imaging lens system includes a first lens, a second lens, a third lens, a fourth lens, a fifth lens, a sixth lens, a seventh lens, and an eighth lens, sequentially arranged from an object side. A material of the first to third lenses is different from a material of the fourth to eighth lenses. Each of the second lens and the third lens has a positive refractive power. The imaging lens system satisfies conditional expression: $|L3DTn|<10.0\ [10^{-6}/°\ C.]$, where L3DTn is a change rate in refractive index according to a change in temperature of the third lens.

The material of the first to third lenses may be glass.

The material of the fourth to eighth lenses may be plastic.

The material of the first to third lenses may be glass, and the material of the fourth to eighth lenses may be plastic.

Other features and aspects will be apparent from the following detailed description, the drawings, and the claims.

Figure 1:
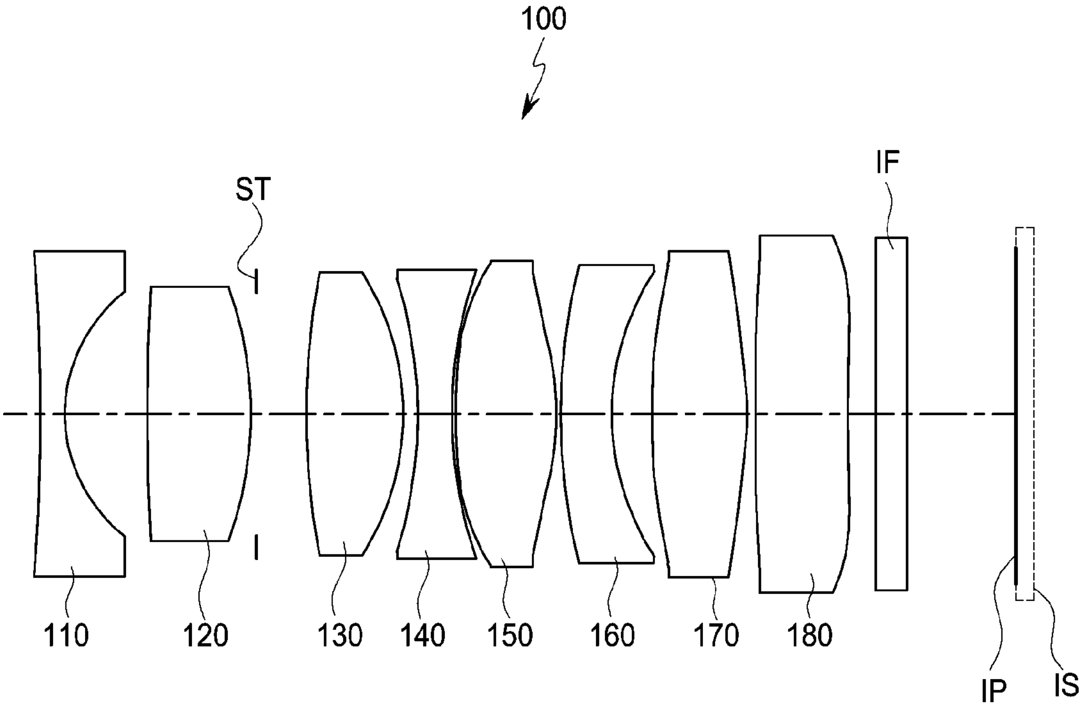
FIG. 1 is a configuration diagram of an imaging lens system according to a first embodiment of the present disclosure.

Throughout the drawings and the detailed description, unless otherwise described, the same reference numerals refer to the same elements. The drawings may not be to scale, and the relative size, proportions, and depiction of elements in the drawings may be exaggerated for clarity, illustration, and convenience.

DETAILED DESCRIPTION

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being “on,” “connected to,” or “coupled to” another element, it may be directly “on,” “connected to,” or “coupled to” the other element, or there may be one or more other elements intervening therebetween. In contrast, when an element is described as being “directly on,” “directly connected to,” or “directly coupled to” another element, there can be no other elements intervening therebetween.

As used herein, the term “and/or” includes any one and any combination of any two or more of the associated listed items; likewise, “at least one of” includes any one and any combination of any two or more of the associated listed items.

Although terms such as “first,” “second,” and “third” may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as “above,” “upper,” “below,” “lower,” and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being “above,” or “upper” relative to another element would then be “below,” or “lower” relative to the other element. Thus, the term “above” encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles “a,” “an,” and “the” are intended to include the plural forms as well, unless the context clearly indicates otherwise. The terms “comprises,” “includes,” and “has” specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

In the present specification, a first lens refers to a lens most adjacent to an object (or a subject), and an eighth lens refers to a lens most adjacent to an imaging plane (or an image sensor). In the present specification, units of a radius of curvature, a thickness, a TTL (a distance from an object-side surface of the first lens to an imaging plane), an IMGHT (a height of an imaging plane), and a focal length are indicated in millimeters (mm). In addition, units of a change rate in refractive index (DTn) and coefficient of thermal expansion (CTE) described in this specification may be $10^{-6}/°$ C.

A thickness of a lens, a gap between lenses, and a TTL refer to the distance of a lens along an optical axis. Also, in the descriptions of the shape of a lens, a configuration in which one surface is convex indicates that a paraxial region of the surface is convex, and a configuration in which one surface is concave indicates that a paraxial region of the surface is concave. Thus, even when it is described that one surface of a lens is convex, an edge of the lens may be concave. Similarly, even when it is described that one surface of a lens is concave, an edge of the lens may be convex.

According to the first aspect of the present disclosure, an imaging lens system may include a plurality of lenses. For example, according to the first aspect, the imaging lens system may include a first lens, a second lens, a third lens, a fourth lens, a fifth lens, a sixth lens, a seventh lens, and an eighth lens, sequentially arranged from an object side. According to the first aspect, the imaging lens system may include a lens with positive refractive power. For example, in the imaging lens system, according to the first aspect, the second lens and the third lens may have positive refractive power, respectively. According to the first aspect, the imaging lens system may be configured to minimize a change in focal length due to a temperature change. For example, according to the first aspect, the imaging lens system may satisfy the conditional expression $|L3DTn|<10.0\ [10^{-6}/°\ C.]$. In the conditional expression, L3DTn is a change rate in refractive index according to a change in temperature of the third lens.

According to a second aspect of the present disclosure, an imaging lens system may include a plurality of lenses. For example, according to one aspect, an imaging lens system may include a first lens, a second lens, a third lens, a fourth lens, a fifth lens, a sixth lens, a seventh lens, and an eighth lens, sequentially arranged from an object side. According to the second aspect, the imaging lens system may include a convex lens on one side surface. For example, according to the second aspect of the imaging lens system, the second lens may have a convex image-side surface. According to the second form, the imaging lens system may satisfy a unique conditional expression. For example, according to the second aspect, the imaging lens system may satisfy the conditional expression $1.16<f3/f<1.26$. For reference, f is the focal length of the imaging lens system in the conditional expression, and f3 is the focal length of the third lens.

According to a third aspect of the present disclosure, an imaging lens system may include a plurality of lenses. For example, according to the third form, the imaging lens system may include a first lens, a second lens, a third lens, a fourth lens, a fifth lens, a sixth lens, a seventh lens, and an eighth lens, sequentially arranged from an object side. According to the third aspect, the imaging lens system may include a stop. For example, according to the third aspect, the imaging lens system may include a stop disposed between the second and third lenses. According to the third aspect, the imaging lens system may include a lens with positive refractive power. For example, according to the third aspect of the imaging lens system, the second or third lens may have positive refractive power. According to the third form, the imaging lens system may be configured to minimize a change in focal length due to a temperature change. For example, according to the third aspect, the imaging lens system may satisfy the conditional expression $$|L3DTn| < 10.0[10^{-6}/°\ C.].$$

According to a fourth aspect of the present disclosure, an imaging lens system may include a plurality of lenses. For example, according to the fourth aspect, the imaging lens system may include a first lens, a second lens, a third lens, a fourth lens, a fifth lens, a sixth lens, a seventh lens, and an eighth lens sequentially arranged from an object side. According to the fourth aspect, the imaging lens system may include a stop. For example, according to the fourth aspect, the imaging lens system may include a stop disposed between the second and third lenses. According to the fourth aspect, the imaging lens system may be configured to minimize a change in focal length due to a temperature change. For example, according to the fourth aspect, the imaging lens system may satisfy the conditional expression $0.18<LFDTnS/LRDTnS<0.26$. For reference, in the conditional expression, LFDTnS is a sum of change rates in the refractive index of lenses arranged in front of the stop (object side), and LRDTnS is a sum of change rates in the refractive index of lenses arranged behind the stop (image side).

An imaging lens system, according to a fifth aspect of the present disclosure, may include first to eighth lenses, sequentially arranged from an object side, and may satisfy one or more of the following conditional expressions:

$$|L3DTn| < 10.0[10^{-6}/°\ C.]$$

$$f3/f < 1.3$$

$$-1.0 < f1/f3 < -0.6$$

$$1.8 < f2/f3 < 2.6$$

$$-2.0 < f4/f3 < -1.0$$

$$1.0 < f5/f3 < 2.0$$

$$-3.0 < f6/f3 < -2.0$$

$$1.6 < f7/f3 < 5.2$$

$$-5.0 < f8/(f3 + f5 + f7) < 1.0$$

$$-5.0 < (f1 + f2)/(f3 + f4) < -2.0$$

-continued $$0.42 < L1DTn/L3DTn < 0.52$$

$$0.18 < LFDTnS/LRDTnS < 0.26$$

$$0.90 < (L1DTn + L2DTn)/(L3DTn + L4DTn) < 1.20$$

$$0.92 < (L4DTn + L5DTn)/(L6DTn + L7DTn) < 1.20$$

In the above conditional expression, f1 is a focal length of the first lens, f2 is a focal length of the second lens, f4 is a focal length of the fourth lens, f5 is a focal length of the fifth lens, f6 is a focal length of the sixth lens, f7 is a focal length of the seventh lens, f8 is a focal length of the eighth lens, L1DTn is a change rate in the refractive index according to a change in temperature of the first lens, L2DTn is a change rate in the refractive index according to a change in temperature of the second lens, L4DTn is a change rate in the refractive index according to a change in temperature of the fourth lens, L5DTn is a change rate in the refractive index according to a change in temperature of the fifth lens, L6DTn is a change rate in the refractive index according to a change in temperature of the sixth lens, and L7DTn is a change rate in refractive index according to a change in temperature of the seventh lens.

According to the fifth aspect of the present disclosure, the imaging lens system may satisfy some of the above-described conditional expressions in a more limited form as follows.

$$0.6 < |L3DTn| < 9.0[10^{-6}/° C.]$$

$$1.16 < f3/f < 1.26$$

According to a sixth aspect of the present disclosure, an imaging lens system may include characteristics according to the fifth aspect, together with one or more characteristics according to the first to fourth aspects. For example, according to the sixth aspect, the imaging lens system may include characteristics of the first aspect and may satisfy one or more conditional expressions according to the fifth aspect. As another example, according to the sixth aspect, the imaging lens system may include characteristics of the second aspect and may satisfy two or more conditional expressions according to the fifth aspect.

According to the first to sixth aspects, the imaging lens systems may include one or more lenses with the following characteristics as needed. For example, according to the first aspect, the imaging lens system may include one of the first to eighth lenses according to the following characteristics. As another example, according to the second aspect, the imaging lens system may include two or more of the first to eighth lenses according to the following characteristics. However, according to the above-described aspect, the imaging lens system does not necessarily include a lens according to the following characteristics.

Below, the characteristics of the first to eighth lenses will be described.

The first lens may have refractive power. For example, the first lens may have negative refractive power. The first lens may have a concave shape on one surface. For example, the first lens may have a concave image-side surface. The first lens may include a spherical surface or an aspherical surface. For example, both surfaces of the first lens may be spherical. The first lens may be formed of a material with high light transmittance and excellent processability. For example, the first lens may be formed of glass. The first lens may be configured to have characteristics advantageous for improving aberrations. For example, the first lens may have a refractive index of 1.75 or more and an Abbe number of 45 or more.

The second lens may have refractive power. For example, the second lens may have positive refractive power. The second lens may have a convex shape on one surface. For example, the second lens may have a convex image-side surface. The second lens may include an aspherical surface. For example, both surfaces of the second lens may be aspherical. The second lens may be formed of a material with high light transmittance and excellent processability. For example, the second lens may be formed of glass. The second lens may have a predetermined refractive index. For example, the refractive index of the second lens may be 1.64 or more.

The third lens may have refractive power. For example, the third lens may have positive refractive power. The third lens may have a convex shape on one surface. For example, the third lens may have a convex image-side surface. The third lens may include an aspherical surface. For example, both surfaces of the third lens may be aspherical. The third lens may be formed of a material with high light transmittance and excellent processability. For example, the third lens may be formed of glass. The third lens may be configured to have characteristics advantageous for improving aberrations. For example, the third lens may have a refractive index of 1.75 or more and an Abbe number of 45 or more.

The fourth lens may have refractive power. For example, the fourth lens may have negative refractive power. The fourth lens may have a concave shape on one surface. For example, the fourth lens may have a concave image-side surface. The fourth lens may include an aspherical surface. For example, both surfaces of the fourth lens may be aspherical. The fourth lens may be formed of a material with high light transmittance and excellent processability. For example, the fourth lens may be formed of a plastic material. The fourth lens may have a predetermined refractive index. For example, the refractive index of the fourth lens may be 1.6 or more.

The fifth lens may have refractive power. For example, the fifth lens may have positive refractive power. The fifth lens may have a convex shape on one surface. For example, the fifth lens may have a convex image-side surface. The fifth lens may include an aspherical surface. For example, both surfaces of the fifth lens may be aspherical. The fifth lens may be formed of a material with high light transmittance and excellent processability. For example, the fifth lens may be formed of a plastic material. The fifth lens may have a predetermined refractive index. For example, the refractive index of the fifth lens may be less than 1.6.

The sixth lens may have refractive power. For example, the sixth lens may have negative refractive power. The sixth lens may have a concave shape on one surface. For example, the sixth lens may have a concave image-side surface. The sixth lens may include an aspherical surface. For example, both surfaces of the sixth lens may be aspherical. The sixth lens may be formed of a material with high light transmittance and excellent processability. For example, the sixth lens may be formed of a plastic material. The sixth lens may have a predetermined refractive index. For example, the refractive index of the sixth lens may be 1.6 or more.

The seventh lens may have refractive power. For example, the seventh lens may have positive refractive power. The seventh lens may have a convex shape on one surface. For example, the seventh lens may have a convex object-side surface. The seventh lens may include an aspherical surface. For example, both surfaces of the seventh lens may be aspherical. The seventh lens may be formed of a material with high light transmittance and excellent processability. For example, the seventh lens may be formed of a plastic material. The seventh lens may have a predetermined refractive index. As an example, the refractive index of the seventh lens may be less than 1.56.

The eighth lens may have refractive power. For example, the eighth lens may have positive or negative refractive power. The eighth lens may have a convex shape on one surface. For example, the eighth lens may have a convex object-side surface. The eighth lens may include an aspherical surface. For example, both surfaces of the eighth lens may be aspherical. The eighth lens may be formed of a material with high light transmittance and excellent processability. For example, the eighth lens may be formed of a plastic material. The eighth lens may have a refractive index, roughly similar to the refractive index of the seventh lens. For example, the refractive index of the eighth lens may be less than 1.56, like the seventh lens.

An aspherical lens constituting an imaging lens system may be expressed by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Fr^{14} + Gr^{16} + \ldots \quad \text{[Equation 1]}$$

In Equation 1, c is the reciprocal of a radius of curvature of a corresponding lens, k is a conic constant, r is a distance from any point on an aspherical surface to an optical axis, A, B, C, D, E, F, F, and G are aspherical surface constants, and Z (or SAG) is a height in an optical axis direction from a certain point on the aspherical surface to a vertex of the corresponding aspherical surface.

An imaging lens system may include lenses formed of different materials. For example, the first to third lenses may be formed of a different material from the fourth to eighth lenses. As a specific example, the first to third lenses may be formed of a glass material that has a low coefficient of thermal expansion due to external shock and a change in temperature, and the fourth lens and the eighth lens may be formed of a plastic material that is easy to process. However, the materials of the first to eighth lenses are not limited to the examples described above. For example, the first lens may be formed of a glass material, and the second to eighth lenses may be formed of a plastic material.

The imaging lens system may include a stop, an image plane, and a filter. In addition, the imaging lens system may further include a protective glass (a cover glass).

The stop may be disposed between the lenses. For example, the stop may be disposed between the second lens and the third lens. As another example, the stop may be disposed on an image side of a lens with positive refractive power, or between a lens with positive refractive power and a lens with positive refractive power. The image plane may be formed at a point at which light refracted by the first to eighth lenses forms an image. The image plane may be formed by an image sensor. For example, the image plane may be formed on a surface of the image sensor or on an internal side of the image sensor. The filter may be disposed between the eighth lens and the image plane. The filter may block rays of some wavelengths. For example, the filter may block rays with infrared wavelengths. The protective glass may be placed between the filter and the image plane.

Hereinafter, embodiments of the present disclosure will be described in detail based on the attached illustration drawings.

First, an imaging lens system according to a first embodiment will be described with reference to FIG. 1.

An imaging lens system 100 may include a first lens 110, a second lens 120, a third lens 130, a fourth lens 140, a fifth lens 150, a sixth lens 160, a seventh lens 170, and an eighth lens 180.

The first lens 110 may have negative refractive power, a concave object-side surface, and a concave image-side surface. The second lens 120 may have positive refractive power, a convex object-side surface, and a convex image-side surface. The third lens 130 may have positive refractive power, a convex object-side surface, and a convex image-side surface. The fourth lens 140 may have negative refractive power, a concave object-side surface, and a concave image-side surface. The fifth lens 150 may have positive refractive power, a convex object-side surface, and a convex image-side surface. The sixth lens 160 may have negative refractive power, a convex object-side surface, and a concave image-side surface. The seventh lens 170 may have positive refractive power, a convex object-side surface, and a convex image-side surface. The eighth lens 180 may have negative refractive power, a convex object-side surface, and a concave image-side surface.

The imaging lens system 100 may further include a stop ST, a filter IF, and an image plane IP. The stop ST may be disposed between the second lens 120 and the third lens 130. The image plane IP may be formed on an image sensor IS, and the filter IF may be disposed between the eighth lens 180 and the image plane IP.

Figure 2:
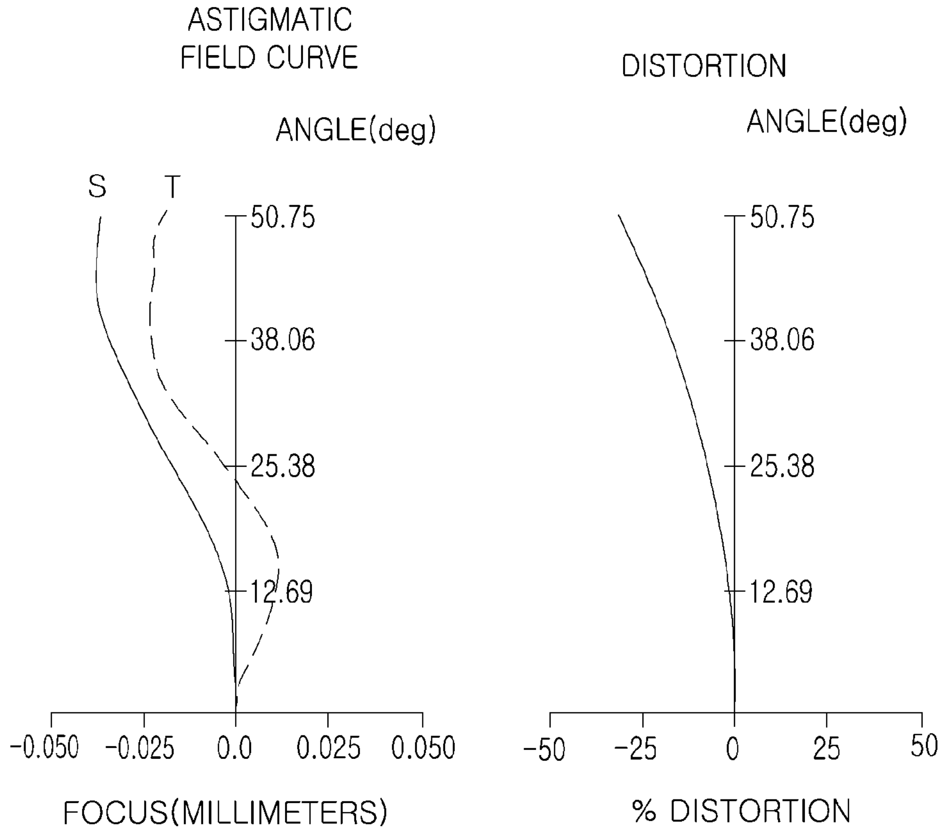
FIG. 2 is an aberration curve of the imaging lens system illustrated in FIG. 1.
Figure 3:
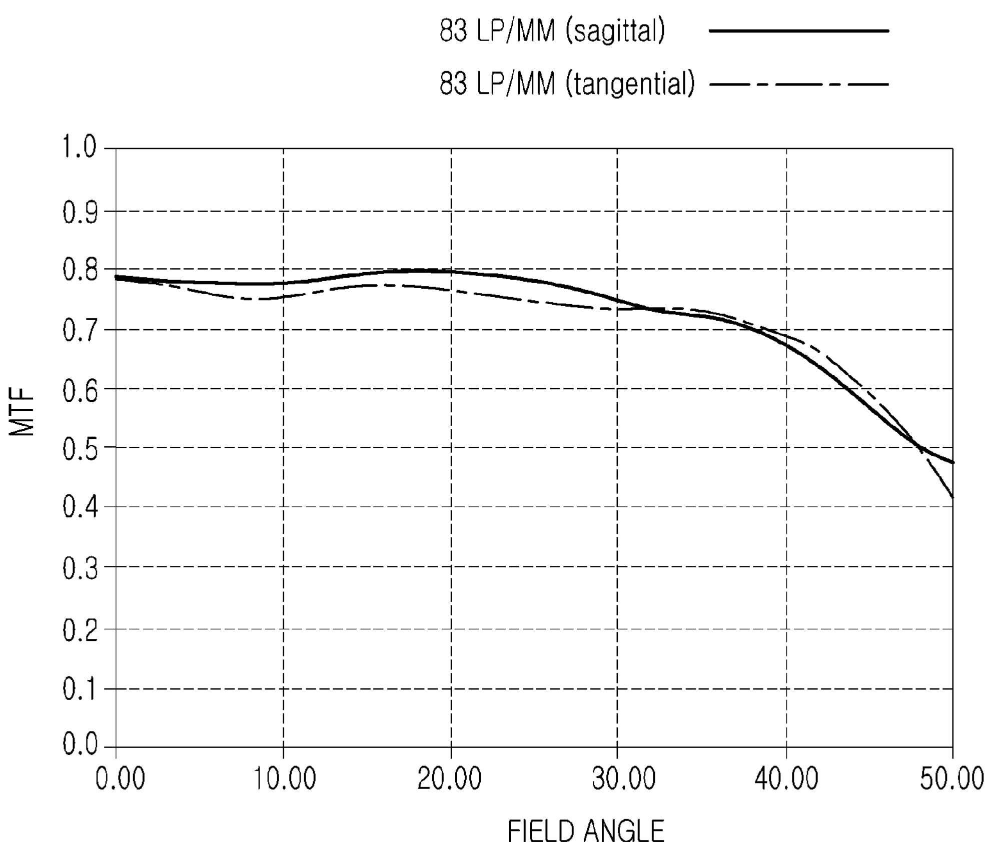
FIG. 3 is an MTF curve of the imaging lens system illustrated in FIG. 1.
Figure 4:
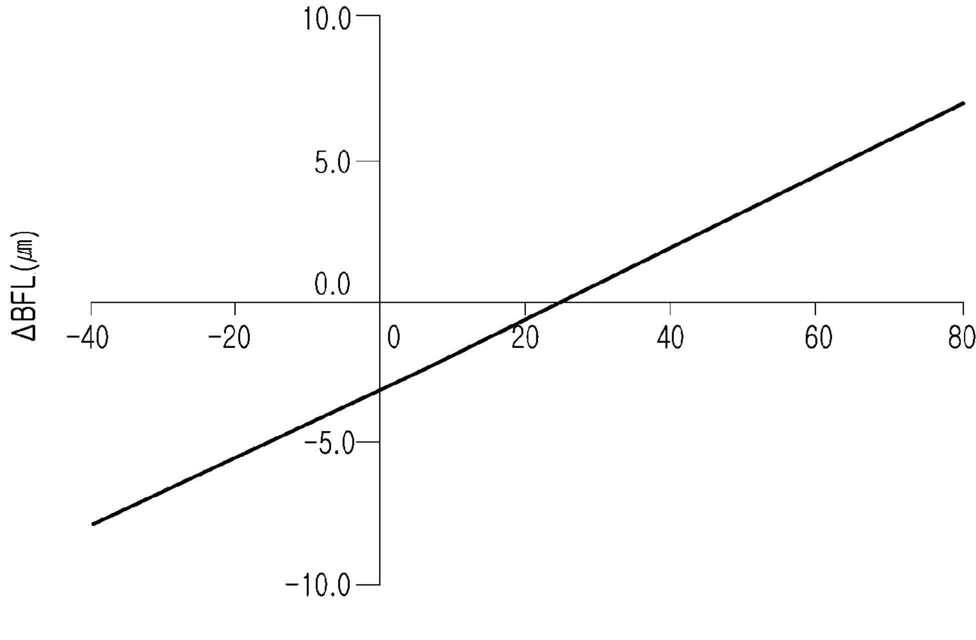
FIG. 4 is a curve illustrating a back focal length (BFL) according to a change in temperature of the imaging lens system illustrated in FIG. 1.

FIG. 2 illustrates an aberration curve of an imaging lens system according to the present embodiment, and FIGS. 3 and 4 illustrate MTF characteristics and change amounts of a back focal length (ΔBFL: μm) according to a temperature in an imaging lens system according to the present embodiment.

Tables 1 and 2 illustrate lens characteristics and aspherical values of an imaging lens system according to the present embodiment.

TABLE 1

| Surface No. | Component | Curvature Radius | Thickness/ Distance | Refractive Index | Abbe No. | DTn | CTE |
|---|---|---|---|---|---|---|---|
| S1 | 1st Lens | −95.5990 | 0.8000 | 1.7725 | 49.62 | 3.60 | 8.00 |
| S2 | | 4.6760 | 2.4530 | | | | |
| S3 | 2nd Lens | 850.4310 | 3.0000 | 1.6561 | 21.24 | −120.00 | 66.00 |
| S4 | | −11.3140 | 0.3750 | | | | |
| S5 | Stop | Infinity | 1.2240 | — | — | — | — |
| S6 | 3rd Lens | 18.9890 | 3.0000 | 1.7421 | 49.25 | 7.50 | 6.00 |
| S7 | | −7.5430 | 0.5000 | | | | |
| S8 | 4th Lens | −11.5210 | 1.0000 | 1.6561 | 21.24 | −120.00 | 66.00 |
| S9 | | 16.0790 | 0.1080 | | | | |
| S10 | 5th Lens | 96.8440 | 2.9990 | 1.5365 | 56.5 | −95.70 | 60.00 |
| S11 | | −7.0700 | 0.1180 | | | | |
| S12 | 6th Lens | 8.6480 | 1.5030 | 1.6561 | 21.24 | −120.00 | 66.00 |
| S13 | | 5.0040 | 1.2440 | | | | |
| S14 | 7th Lens | 68.1090 | 2.8080 | 1.5365 | 56.5 | −95.70 | 60.00 |
| S15 | | −9.6800 | 0.1460 | | | | |
| S16 | 8th Lens | 48.4660 | 2.8450 | 1.5365 | 56.5 | −95.70 | 60.00 |
| S17 | | 28.6960 | 0.8000 | | | | |
| S18 | Filter | Infinity | 0.9000 | 1.5168 | 64.17 | 1.60 | 8.00 |
| S19 | | Infinity | 2.9000 | | | | |

TABLE 1-continued

| Surface No. | Component | Curvature Radius | Thickness/ Distance | Refractive Index | Abbe No. | DTn | CTE |
|---|---|---|---|---|---|---|---|
| S20 | | Infinity | 0.4570 | — | — | — | — |
| S21 | Image Plane | Infinity | 0.0000 | — | — | — | — |

TABLE 2

| Surface No. | K | A | B | C | D |
|---|---|---|---|---|---|
| S3 | 0 | 6.283E−06 | 1.349E−07 | 1.263E−06 | −2.811E−08 |
| S4 | 0 | 1.699E−05 | 1.385E−06 | 8.377E−07 | −4.042E−08 |
| S6 | 0 | −3.639E−04 | 1.608E−05 | −1.150E−07 | −2.348E−10 |
| S7 | 0 | 1.105E−03 | −5.131E−05 | 1.930E−06 | −2.183E−08 |
| S8 | 0 | 5.591E−04 | −5.521E−05 | 3.333E−06 | −9.631E−08 |
| S9 | 0 | 7.228E−04 | −2.778E−05 | 7.318E−07 | −2.661E−08 |
| S10 | 0 | 4.097E−03 | −1.301E−04 | 1.891E−06 | −3.473E−09 |
| S11 | 0 | 2.731E−03 | −3.056E−05 | −1.123E−06 | 5.680E−08 |
| S12 | 0 | −3.618E−03 | 1.340E−04 | −2.777E−06 | 4.384E−08 |
| S13 | 0 | −5.556E−03 | 1.971E−04 | −6.892E−06 | 2.328E−07 |
| S14 | 0 | 2.406E−03 | −1.586E−04 | 6.277E−06 | −1.231E−07 |
| S15 | 0 | 1.823E−03 | 4.749E−05 | −4.300E−06 | 6.348E−08 |
| S16 | 0 | −7.404E−04 | 1.056E−04 | −5.764E−06 | 1.008E−07 |
| S17 | 0 | −1.862E−03 | 7.120E−05 | −2.610E−06 | 3.519E−08 |

Figure 5:
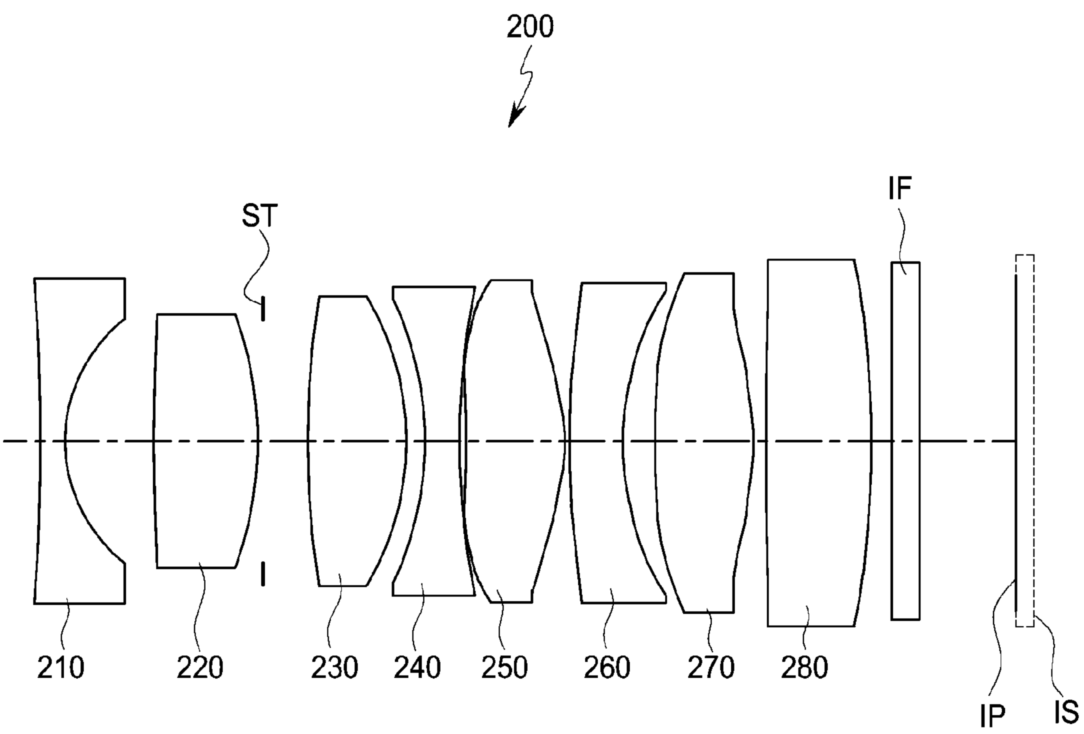
FIG. 5 is a configuration diagram of an imaging lens system according to a second embodiment of the present disclosure.

An imaging lens system according to a second embodiment will be described with reference to FIG. 5.

An imaging lens system 200 may include a first lens 210, a second lens 220, a third lens 230, a fourth lens 240, a fifth lens 250, a sixth lens 260, a seventh lens 270, and an eighth lens 280.

The first lens 210 may have negative refractive power, a concave object-side surface, and a concave image-side surface. The second lens 220 may have positive refractive power, a convex object-side surface, and a convex image-side surface. The third lens 230 may have positive refractive power, a convex object-side surface, and a convex image-side surface. The fourth lens 240 may have negative refractive power, a concave object-side surface, and a concave image-side surface. The fifth lens 250 may have positive refractive power, a concave object-side surface, and a convex image-side surface. The sixth lens 260 may have negative refractive power, a convex object-side surface, and a concave image-side surface. The seventh lens 270 may have positive refractive power, a convex object-side surface, and a convex image-side surface. The eighth lens 280 may have negative refractive power, a convex object-side surface, and a concave image-side surface.

The imaging lens system 200 may further include a stop ST, a filter IF, and an image plane IP. The stop ST may be disposed between the second lens 220 and the third lens 230. The image plane IP may be formed on an image sensor IS, and the filter IF may be disposed between the eighth lens 280 and the image plane IP.

Figure 6:
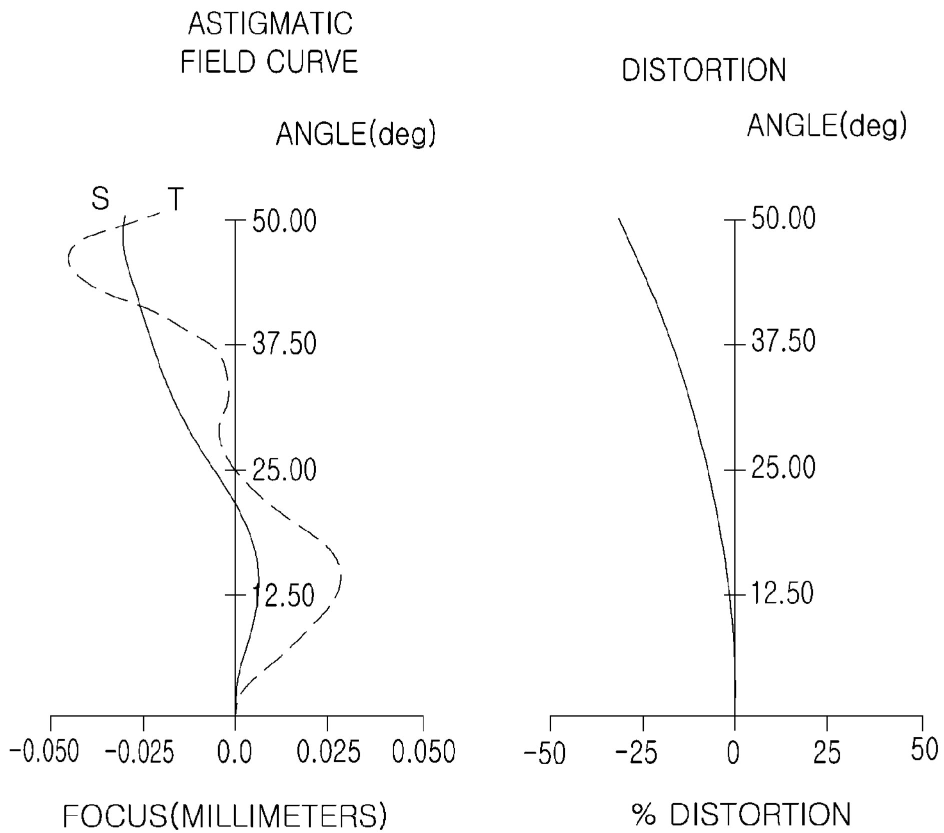
FIG. 6 is an aberration curve of the imaging lens system illustrated in FIG. 5.
Figure 7:
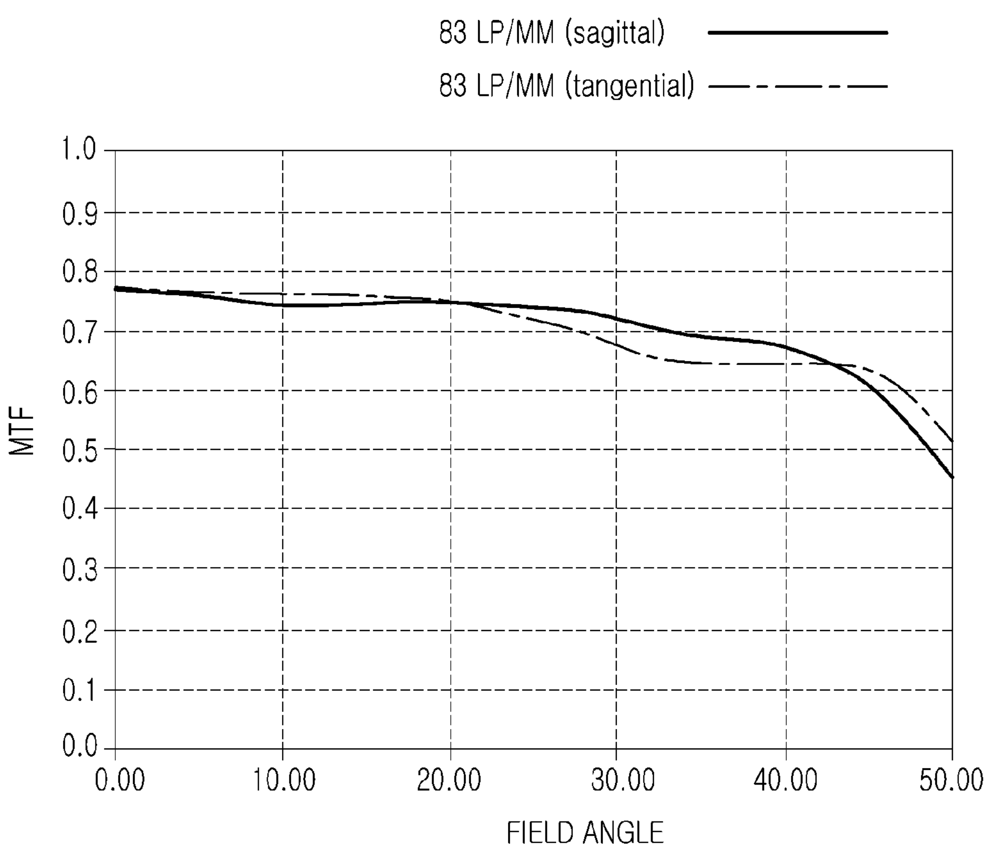
FIG. 7 is an MTF curve of the imaging lens system illustrated in FIG. 5.
Figure 8:
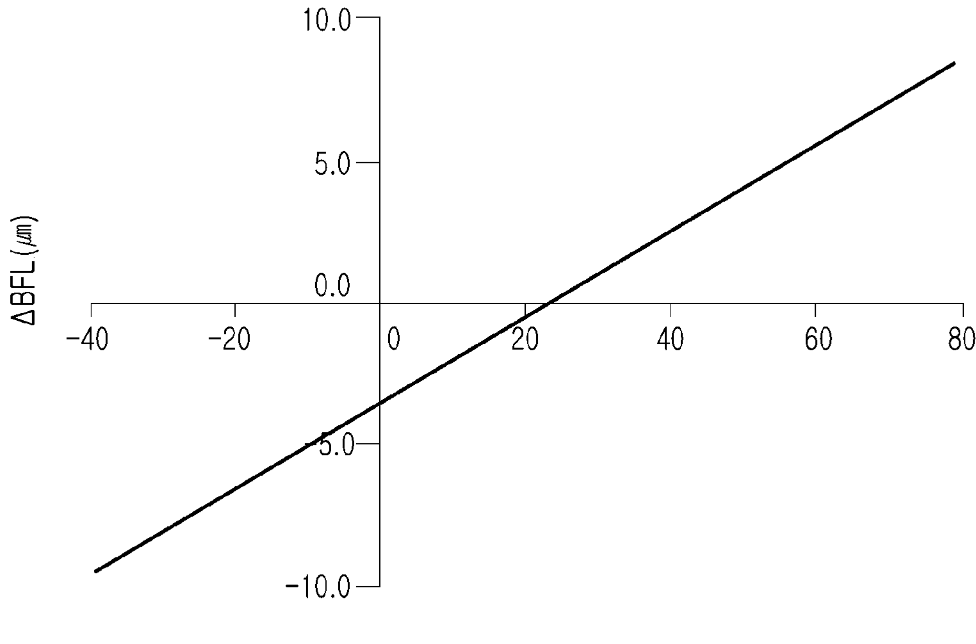
FIG. 8 is a curve illustrating BFL according to a change in temperature of the imaging lens system illustrated in FIG. 5.

FIG. 6 illustrates an aberration curve of an imaging lens system according to the present embodiment, and FIGS. 7 and 8 illustrate MTF characteristics and change amounts of a back focal length (ΔBFL: μm) according to a temperature in an imaging lens system according to the present embodiment.

Tables 3 and 4 illustrate lens characteristics and aspherical values of an imaging lens system according to the present embodiment.

TABLE 3

| Surface No. | Component | Curvature Radius | Thickness/ Distance | Refractive Index | Abbe No. | DTn | CTE |
|---|---|---|---|---|---|---|---|
| S1 | 1st Lens | −72.4920 | 0.8000 | 1.7725 | 49.62 | 3.60 | 8.00 |
| S2 | | 4.8540 | 2.5670 | | | | |
| S3 | 2nd Lens | 131.9920 | 2.9400 | 1.6561 | 21.24 | −120.00 | 66.00 |
| S4 | | −12.0580 | 0.2320 | | | | |
| S5 | Stop | Infinity | 1.3920 | — | — | — | — |
| S6 | 3rd Lens | 21.5940 | 2.9700 | 1.7421 | 49.25 | 7.50 | 6.00 |
| S7 | | −7.1510 | 0.5000 | | | | |
| S8 | 4th Lens | −10.5830 | 1.0000 | 1.6561 | 21.24 | −120.00 | 66.00 |
| S9 | | 23.6640 | 0.1640 | | | | |
| S10 | 5th Lens | −35.2410 | 3.0000 | 1.5365 | 56.5 | −95.70 | 60.00 |
| S11 | | −6.4180 | 0.1000 | | | | |
| S12 | 6th Lens | 9.0730 | 1.6210 | 1.6561 | 21.24 | −120.00 | 66.00 |
| S13 | | 5.0550 | 1.0050 | | | | |
| S14 | 7th Lens | 48.7740 | 2.8200 | 1.5365 | 56.5 | −95.70 | 60.00 |
| S15 | | −9.0850 | 0.4490 | | | | |
| S16 | 8th Lens | 110.2430 | 2.9230 | 1.5365 | 56.5 | −95.70 | 60.00 |
| S17 | | 33.5300 | 0.8000 | | | | |
| S18 | Filter | Infinity | 0.9000 | 1.5168 | 64.17 | 1.60 | 8.00 |
| S19 | | Infinity | 2.9000 | | | | |
| S20 | | Infinity | 0.4550 | — | — | — | — |
| S21 | Image Plane | Infinity | 0.0000 | — | — | — | — |

TABLE 4

| Surface No. | K | A | B | C | D |
|---|---|---|---|---|---|
| S3 | 0 | 3.393E−05 | 8.020E−07 | 1.708E−06 | −5.764E−08 |
| S4 | 0 | −6.786E−05 | 1.848E−05 | 3.087E−07 | −2.529E−08 |
| S6 | 0 | −5.780E−04 | 2.606E−05 | −2.412E−07 | 6.577E−11 |
| S7 | 0 | 1.142E−03 | −5.963E−05 | 2.599E−06 | −3.499E−08 |
| S8 | 0 | 1.046E−03 | −1.363E−04 | 7.514E−06 | −1.974E−07 |
| S9 | 0 | 1.509E−03 | −1.057E−04 | 3.209E−06 | −4.747E−08 |
| S10 | 0 | 4.908E−03 | −2.133E−04 | 5.334E−06 | −4.386E−08 |
| S11 | 0 | 2.708E−03 | −7.157E−05 | 2.351E−06 | −5.909E−09 |
| S12 | 0 | −4.284E−03 | 1.656E−04 | −1.379E−06 | −3.702E−08 |
| S13 | 0 | −6.276E−03 | 2.885E−04 | −1.402E−05 | 6.121E−07 |
| S14 | 0 | 2.674E−03 | −1.955E−04 | 9.093E−06 | −1.632E−07 |
| S15 | 0 | 1.873E−03 | −6.900E−06 | 1.593E−06 | −7.461E−08 |
| S16 | 0 | −7.059E−04 | 6.938E−05 | −1.151E−06 | −2.158E−08 |
| S17 | 0 | −1.594E−03 | 6.121E−05 | −1.553E−06 | 8.457E−09 |

Figure 9:
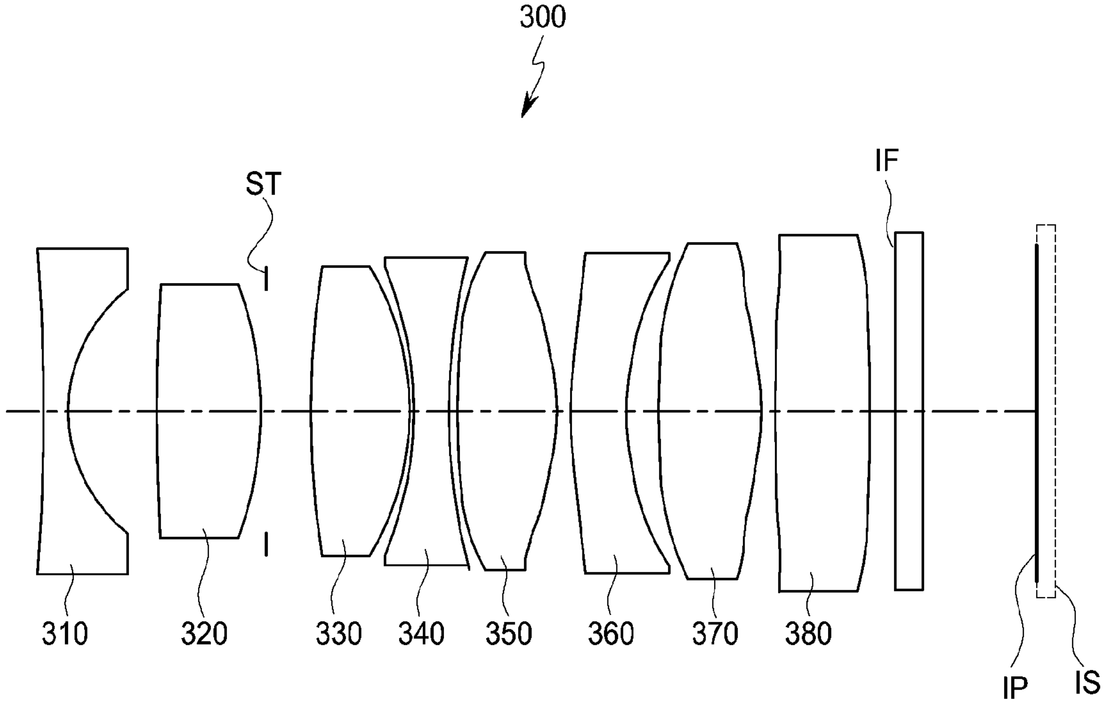
FIG. 9 is a configuration diagram of an imaging lens system according to a third embodiment of the present disclosure.

An imaging lens system according to a third embodiment will be described with reference to FIG. 9.

An imaging lens system 300 may include a first lens 310, a second lens 320, a third lens 330, a fourth lens 340, a fifth lens 350, a sixth lens 360, a seventh lens 370, and an eighth lens 380.

The first lens 310 may have negative refractive power, a concave object-side surface, and a concave image-side surface. The second lens 320 may have positive refractive power, a convex object-side surface, and a convex image-side surface. The third lens 330 may have positive refractive power, a convex object-side surface, and a convex image-side surface. The fourth lens 340 may have negative refractive power, a concave object-side surface, and a concave image-side surface. The fifth lens 350 may have positive refractive power, a concave object-side surface, and a convex image-side surface. The sixth lens 360 may have negative refractive power, a convex object-side surface, and a concave image-side surface. The seventh lens 370 may have positive refractive power and, a convex object-side surface and a convex image-side surface. The eighth lens 380 may have negative refractive power, a convex object-side surface, and a concave image-side surface.

The imaging lens system 300 may further include a stop ST, a filter IF, and an image plane IP. The stop ST may be disposed between the second lens 320 and the third lens 330. The image plane IP may be formed on an image sensor IS, and the filter IF may be disposed between the eighth lens 380 and the image plane IP.

Figure 10:
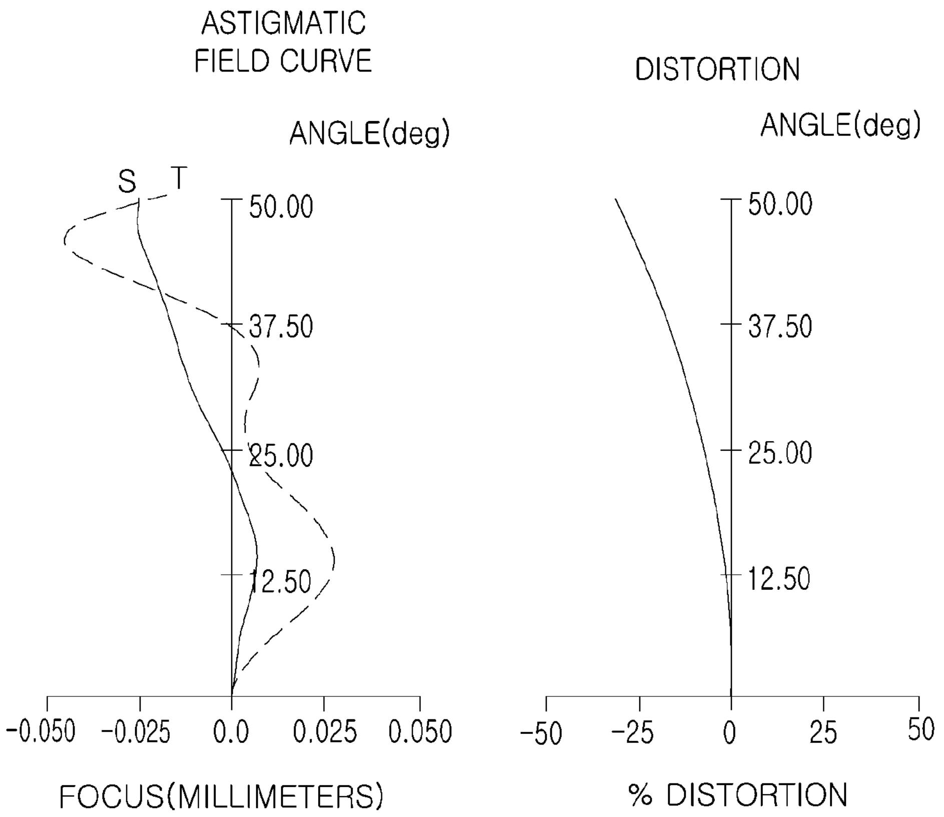
FIG. 10 is an aberration curve of the imaging lens system illustrated in FIG. 9.
Figure 11:
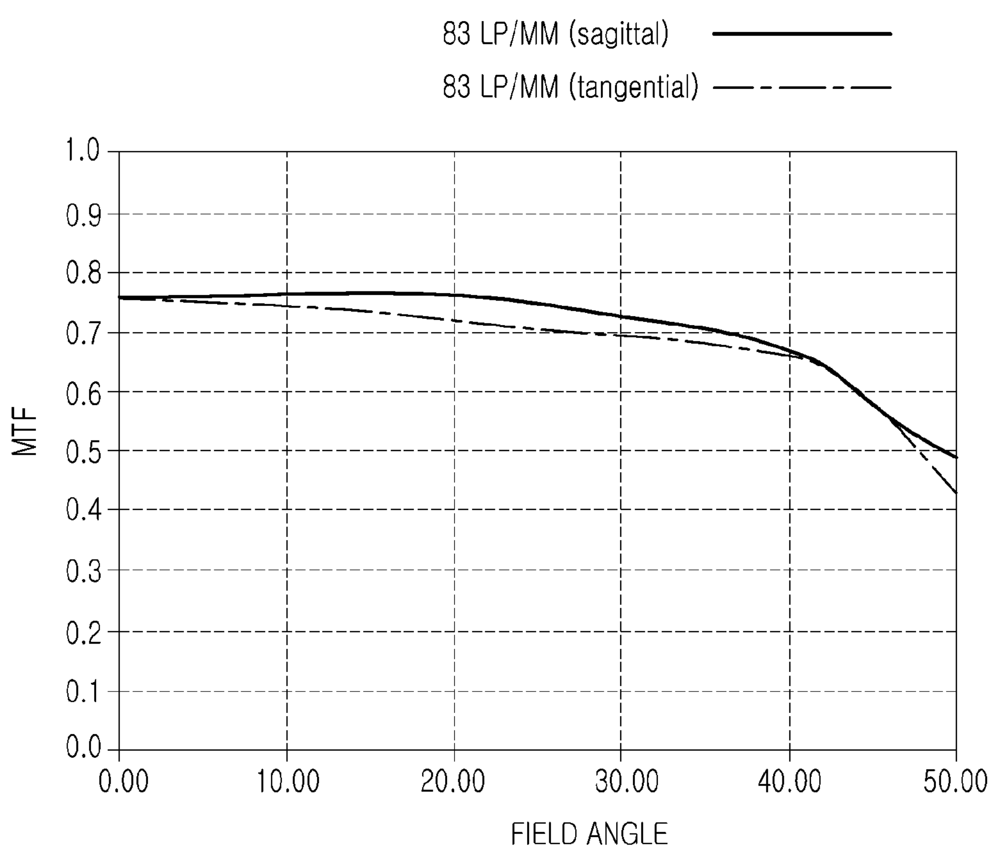
FIG. 11 is an MTF curve of the imaging lens system illustrated in FIG. 9.
Figure 12:
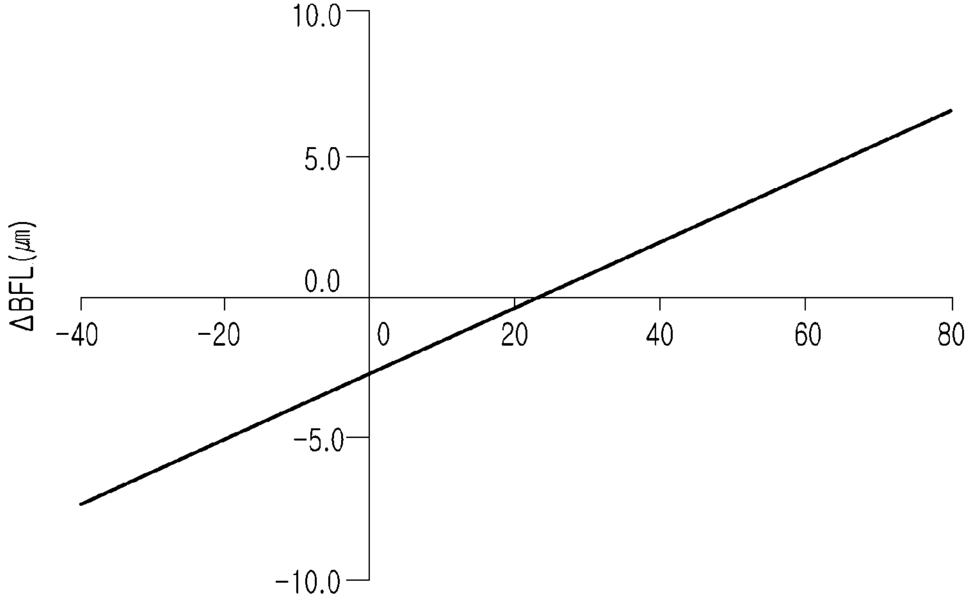
FIG. 12 is a curve illustrating BFL according to a change in temperature of the imaging lens system illustrated in FIG. 9.

FIG. 10 illustrates an aberration curve of an imaging lens system according to the present embodiment, and FIGS. 11 and 12 illustrate MTF characteristics and change amounts of a back focal length (ΔBFL: μm) according to a temperature in an imaging lens system according to the present embodiment.

Tables 5 and 6 illustrate lens characteristics and aspherical values of an imaging lens system according to the present embodiment.

TABLE 5

| Surface No. | Component | Curvature Radius | Thickness/ Distance | Refractive Index | Abbe No. | DTn | CTE |
|---|---|---|---|---|---|---|---|
| S1 | 1st Lens | −69.9210 | 0.8000 | 1.7725 | 49.62 | 3.60 | 8.00 |
| S2 | | 4.7840 | 2.6830 | | | | |
| S3 | 2nd Lens | 147.1060 | 2.9550 | 1.6561 | 21.24 | −120.00 | 66.00 |
| S4 | | −10.5630 | 0.1720 | | | | |
| S5 | Stop | Infinity | 1.4910 | — | — | — | — |
| S6 | 3rd Lens | 20.7870 | 2.9580 | 1.7421 | 49.25 | 7.50 | 6.00 |
| S7 | | −7.1490 | 0.1300 | | | | |
| S8 | 4th Lens | −10.4430 | 1.0150 | 1.6561 | 21.24 | −120.00 | 66.00 |
| S9 | | 22.5740 | 0.2720 | | | | |
| S10 | 5th Lens | −30.4090 | 2.9530 | 1.5365 | 56.5 | −95.70 | 60.00 |
| S11 | | −6.4330 | 0.3840 | | | | |
| S12 | 6th Lens | 9.2250 | 1.6630 | 1.6561 | 21.24 | −120.00 | 66.00 |
| S13 | | 5.0480 | 1.0650 | | | | |
| S14 | 7th Lens | 75.5540 | 2.9260 | 1.5365 | 56.5 | −95.70 | 60.00 |
| S15 | | −8.6580 | 0.4200 | | | | |
| S16 | 8th Lens | 81.2800 | 2.7870 | 1.5365 | 56.5 | −95.70 | 60.00 |
| S17 | | 29.8810 | 0.8000 | | | | |
| S18 | Filter | Infinity | 0.9000 | 1.5168 | 64.17 | 1.60 | 8.00 |
| S19 | | Infinity | 2.9000 | | | | |
| S20 | | Infinity | 0.4640 | — | — | — | — |
| S21 | Image Plane | Infinity | 0.0000 | — | — | — | — |

TABLE 6

| Surface No. | K | A | B | C | D |
|---|---|---|---|---|---|
| S3 | 0 | 5.574E−05 | 5.111E−06 | 1.085E−06 | −3.529E−08 |
| S4 | 0 | 2.083E−05 | 1.313E−05 | 1.483E−07 | −2.221E−08 |
| S6 | 0 | −5.236E−04 | 2.150E−05 | −1.803E−07 | −2.478E−11 |
| S7 | 0 | 1.183E−03 | −5.738E−05 | 2.133E−06 | −2.130E−08 |
| S8 | 0 | 8.201E−04 | −9.022E−05 | 4.274E−06 | −1.150E−07 |
| S9 | 0 | 1.375E−03 | −7.995E−05 | 1.631E−06 | −1.560E−08 |
| S10 | 0 | 4.723E−03 | −1.881E−04 | 3.998E−06 | −1.869E−08 |
| S11 | 0 | 2.384E−03 | −2.131E−05 | −3.727E−07 | 4.389E−08 |
| S12 | 0 | −4.435E−03 | 1.988E−04 | −3.476E−06 | 5.179E−09 |
| S13 | 0 | −6.455E−03 | 3.205E−04 | −1.609E−05 | 6.484E−07 |
| S14 | 0 | 2.571E−03 | −1.648E−04 | 6.785E−06 | −1.100E−07 |
| S15 | 0 | 1.865E−03 | 8.296E−06 | 2.244E−07 | −4.209E−08 |
| S16 | 0 | −9.011E−04 | 8.901E−05 | −1.921E−06 | −7.474E−09 |
| S17 | 0 | −1.776E−03 | 7.708E−05 | −1.912E−06 | 1.100E−08 |

Figure 13:
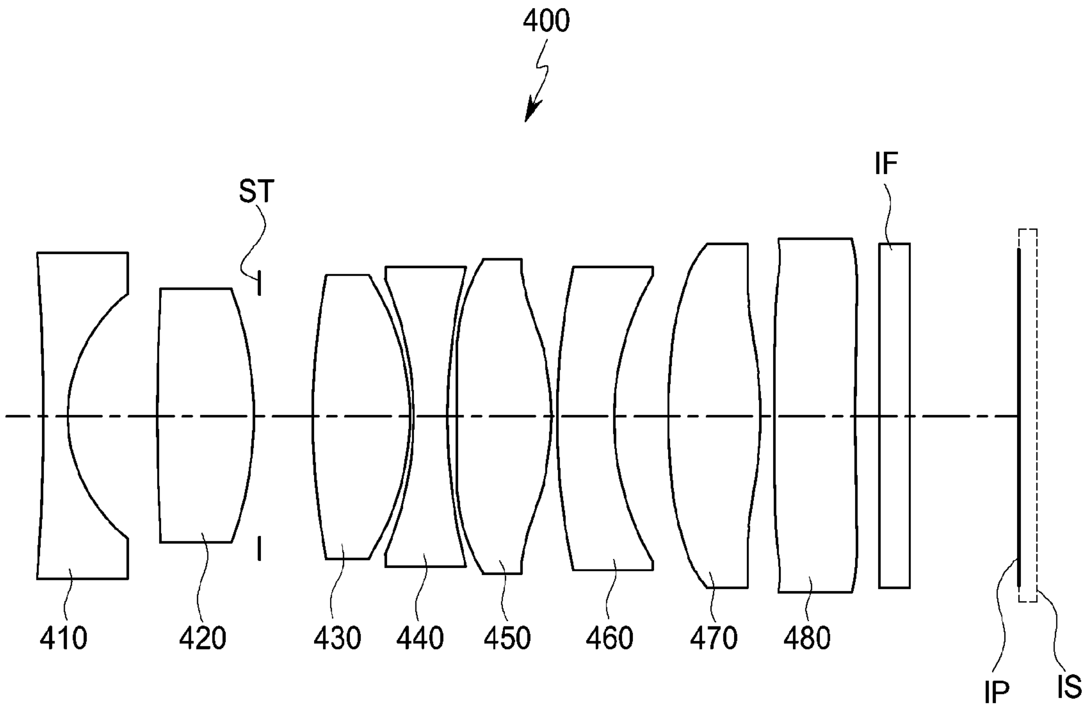
FIG. 13 is a configuration diagram of an imaging lens system according to a fourth embodiment of the present disclosure.

An imaging lens system according to a fourth embodiment will be described with reference to FIG. 13.

An imaging lens system 400 may include a first lens 410, a second lens 420, a third lens 430, a fourth lens 440, a fifth lens 450, a sixth lens 460, a seventh lens 470, and an eighth lens 480.

The first lens 410 may have negative refractive power, a concave object-side surface, and a concave image-side surface. The second lens 420 may have positive refractive power, a convex object-side surface, and a convex image-side surface. The third lens 430 may have positive refractive power, a convex object-side surface, and a convex image-side surface. The fourth lens 440 may have negative refractive power, a concave object-side surface, and a concave image-side surface. The fifth lens 450 may have positive refractive power, a concave object-side surface, and a convex image-side surface. The sixth lens 460 may have negative refractive power, a convex object-side surface, and a concave image-side surface. The seventh lens 470 may have positive refractive power, a convex object-side surface, and a convex image-side surface. The eighth lens 480 may have negative refractive power, a convex object-side surface, and a concave image-side surface.

The imaging lens system 400 may further include a stop ST, a filter IF, and an image plane IP. The stop ST may be disposed between the second lens 420 and the third lens 430. The image plane IP may be formed on an image sensor IS, and the filter IF may be disposed between the eighth lens 480 and the image plane IP.

Figure 14:
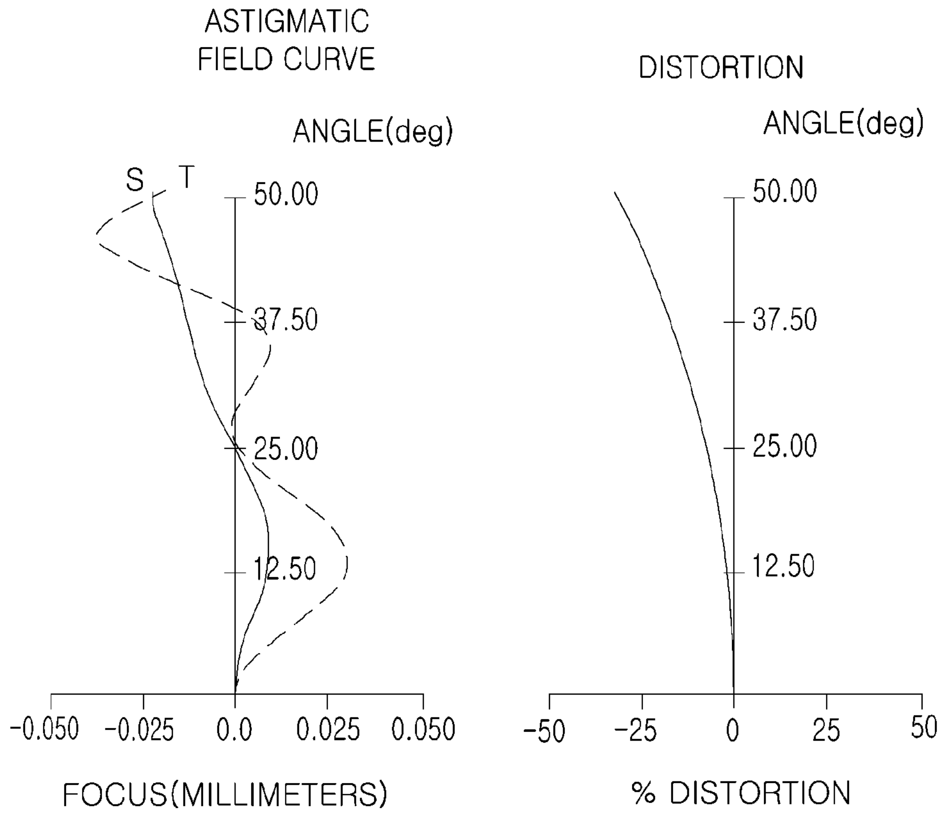
FIG. 14 is an aberration curve of the imaging lens system illustrated in FIG. 13.
Figure 15:
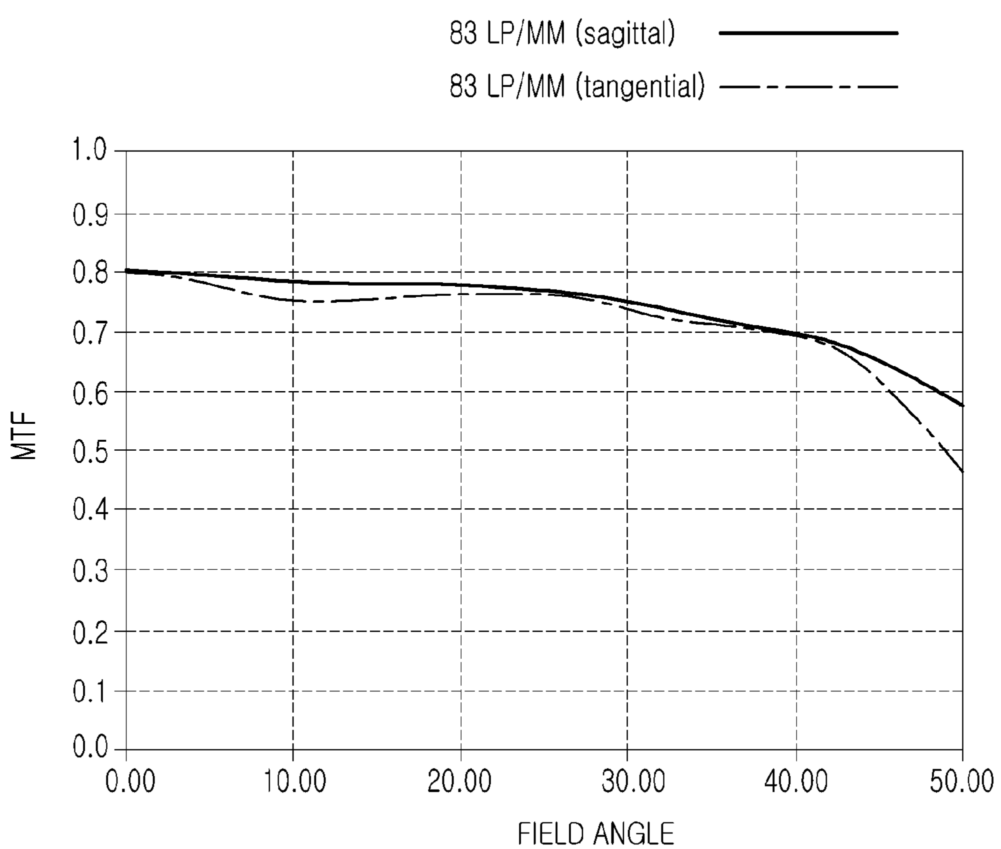
FIG. 15 is an MTF curve of the imaging lens system illustrated in FIG. 13.
Figure 16:
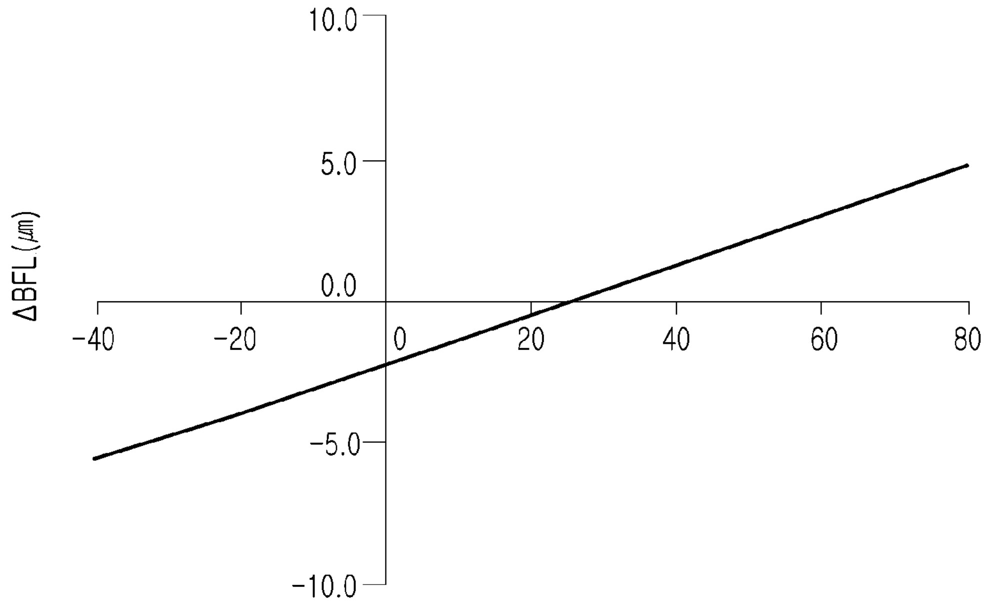
FIG. 16 is a curve illustrating BFL according to a change in temperature of the imaging lens system illustrated in FIG. 13.

FIG. 14 illustrates an aberration curve of an imaging lens system according to the present embodiment, and FIGS. 15 and 16 illustrate MTF characteristics and change amounts of a back focal length (ΔBFL: μm) according to a temperature in an imaging lens system according to the present embodiment.

Tables 7 and 8 illustrate lens characteristics and aspherical values of an imaging lens system according to the present embodiment.

TABLE 7

| Surface No. | Component | Curvature Radius | Thickness/Distance | Refractive Index | Abbe No. | DTn | CTE |
|---|---|---|---|---|---|---|---|
| S1 | 1st Lens | −58.5320 | 0.8000 | 1.7725 | 49.62 | 3.60 | 8.00 |
| S2 | | 4.7940 | 2.7030 | | | | |
| S3 | 2nd Lens | 137.2390 | 3.0000 | 1.6561 | 21.24 | −120.00 | 66.00 |
| S4 | | −10.3190 | 0.1770 | | | | |
| S5 | Stop | Infinity | 1.5970 | — | — | — | — |
| S6 | 3rd Lens | 21.0540 | 2.9820 | 1.7421 | 49.25 | 7.50 | 6.00 |
| S7 | | −7.1390 | 0.1060 | | | | |
| S8 | 4th Lens | −10.4580 | 1.0260 | 1.6561 | 21.24 | −120.00 | 66.00 |
| S9 | | 23.7420 | 0.1830 | | | | |
| S10 | 5th Lens | −31.2300 | 2.9990 | 1.5365 | 56.5 | −95.70 | 60.00 |
| S11 | | −6.4160 | 0.1120 | | | | |
| S12 | 6th Lens | 9.3590 | 1.6900 | 1.6561 | 21.24 | −120.00 | 66.00 |
| S13 | | 5.0270 | 1.7000 | | | | |
| S14 | 7th Lens | 39.4670 | 2.8050 | 1.5365 | 56.5 | −95.70 | 60.00 |
| S15 | | −9.5880 | 0.4040 | | | | |
| S16 | 8th Lens | 84.7880 | 2.4400 | 1.5365 | 56.5 | −95.70 | 60.00 |
| S17 | | 26.4800 | 0.8000 | | | | |
| S18 | Filter | Infinity | 0.9000 | 1.5168 | 64.17 | 1.60 | 8.00 |
| S19 | | Infinity | 2.9000 | | | | |
| S20 | | Infinity | 0.4870 | — | — | — | — |
| S21 | Image Plane | Infinity | 0.0000 | — | — | — | — |

TABLE 8

| Surface No. | K | A | B | C | D |
|---|---|---|---|---|---|
| S3 | 0 | 5.574E−05 | 5.111E−06 | 1.085E−06 | −3.529E−08 |
| S4 | 0 | 2.083E−05 | 1.313E−05 | 1.483E−07 | −2.221E−08 |
| S6 | 0 | −5.236E−04 | 2.150E−05 | −1.803E−07 | −2.478E−11 |
| S7 | 0 | 1.183E−03 | −5.738E−05 | 2.133E−06 | −2.130E−08 |
| S8 | 0 | 8.201E−04 | −9.022E−05 | 4.274E−06 | −1.150E−07 |
| S9 | 0 | 1.375E−03 | −7.995E−05 | 1.631E−06 | −1.560E−08 |
| S10 | 0 | 4.723E−03 | −1.881E−04 | 3.998E−06 | −1.869E−08 |
| S11 | 0 | 2.384E−03 | −2.131E−05 | −3.727E−07 | 4.389E−08 |
| S12 | 0 | −4.435E−03 | 1.988E−04 | −3.476E−06 | 5.179E−09 |
| S13 | 0 | −6.455E−03 | 3.205E−04 | −1.609E−05 | 6.484E−07 |
| S14 | 0 | 2.571E−03 | −1.648E−04 | 6.785E−06 | −1.100E−07 |
| S15 | 0 | 1.865E−03 | 8.296E−06 | 2.244E−07 | −4.209E−08 |
| S16 | 0 | −9.011E−04 | 8.901E−05 | −1.921E−06 | −7.474E−09 |
| S17 | 0 | −1.776E−03 | 7.708E−05 | −1.912E−06 | 1.100E−08 |

Figure 17:
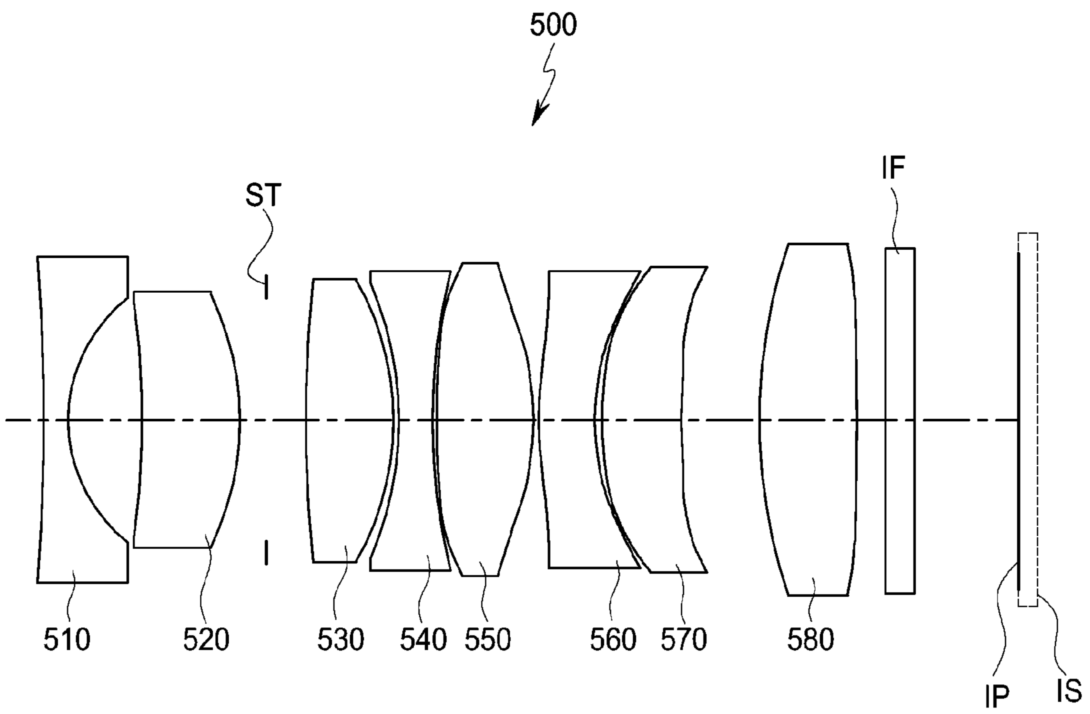
FIG. 17 is a configuration diagram of an imaging lens system according to a fifth embodiment of the present disclosure.

An imaging lens system according to a fifth embodiment will be described with reference to FIG. 17.

An imaging lens system 500 may include a first lens 510, a second lens 520, a third lens 530, a fourth lens 540, a fifth lens 550, a sixth lens 560, a seventh lens 570, and an eighth lens 580.

The first lens 510 may have negative refractive power, a concave object-side surface, and a concave image-side surface. The second lens 520 may have positive refractive power, a concave object-side surface, and a convex image-side surface. The third lens 530 may have positive refractive power, a convex object-side surface, and a convex image-side surface. The fourth lens 540 may have negative refractive power, a concave object-side surface, and a concave image-side surface. The fifth lens 550 may have positive refractive power, a concave object-side surface, and a convex image-side surface. The sixth lens 560 may have negative refractive power, a convex object-side surface, and a concave image-side surface. The seventh lens 570 may have positive refractive power, a convex object-side surface, and a concave image-side surface. The eighth lens 580 may have positive refractive power, a convex object-side surface, and a convex image-side surface.

The imaging lens system 500 may further include a stop ST, a filter IF, and an image plane IP. The stop ST may be disposed between the second lens 520 and the third lens 530. The image plane IP may be formed on an image sensor IS, and the filter IF may be disposed between the eighth lens 580 and the image plane IP.

Figure 18:
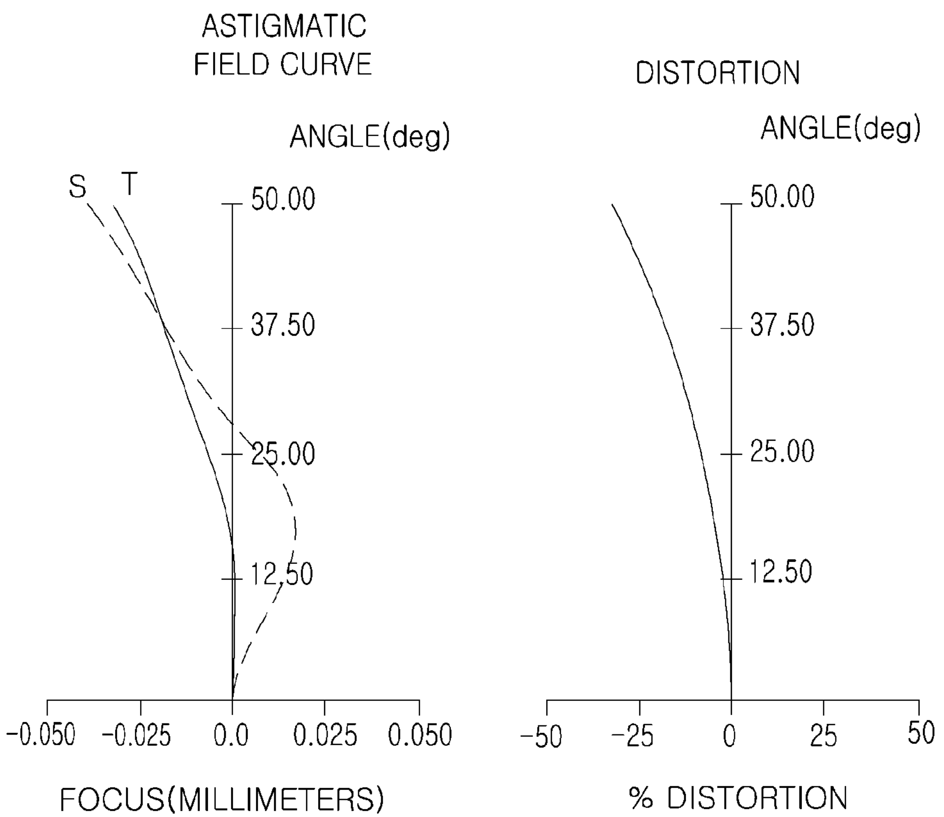
FIG. 18 is an aberration curve of the imaging lens system illustrated in FIG. 17.
Figure 19:
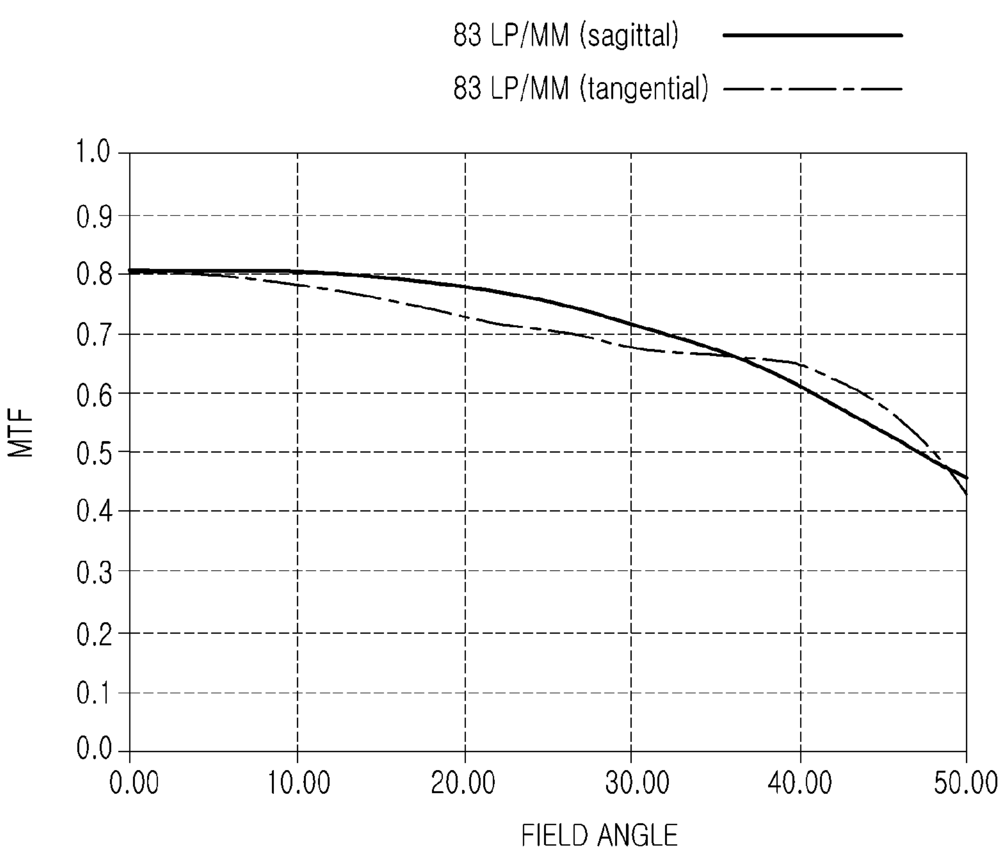
FIG. 19 is an MTF curve of the imaging lens system illustrated in FIG. 17.
Figure 20:
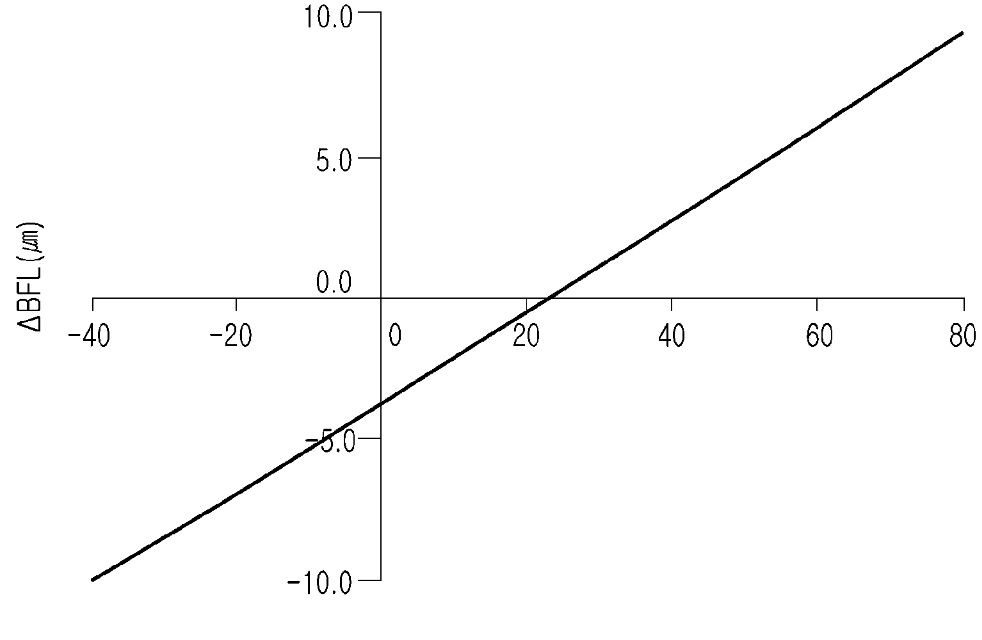
FIG. 20 is a curve illustrating BFL according to a change in temperature of the imaging lens system illustrated in FIG. 17.

FIG. 18 illustrates an aberration curve of an imaging lens system according to the present embodiment, and FIGS. 19 and 20 illustrate MTF characteristics and change amounts of a back focal length (ΔBFL: μm) according to a temperature in an imaging lens system according to the present embodiment.

Table 9 and Table 10 illustrate lens characteristics and aspherical values of an imaging lens system according to the present embodiment.

TABLE 9

| Surface No. | Component | Curvature Radius | Thickness/Distance | Refractive Index | Abbe No. | DTn | CTE |
|---|---|---|---|---|---|---|---|
| S1 | 1st Lens | −88.7460 | 0.8000 | 1.7725 | 49.62 | 3.60 | 8.00 |
| S2 | | 4.6260 | 2.1760 | | | | |
| S3 | 2nd Lens | −41.0480 | 3.0000 | 1.6561 | 21.24 | −120.00 | 66.00 |
| S4 | | −9.1200 | 0.7890 | | | | |
| S5 | Stop | Infinity | 1.1740 | — | — | — | — |
| S6 | 3rd Lens | 27.2540 | 2.7430 | 1.7421 | 49.25 | 7.50 | 6.00 |
| S7 | | −6.7400 | 0.1570 | | | | |
| S8 | 4th Lens | −8.3720 | 1.0000 | 1.6142 | 25.6 | −105.00 | 70.00 |
| S9 | | 26.8690 | 0.1200 | | | | |
| S10 | 5th Lens | −105.5870 | 3.0000 | 1.5365 | 56.5 | −95.70 | 60.00 |
| S11 | | −6.5330 | 0.1000 | | | | |
| S12 | 6th Lens | 10.2940 | 1.6790 | 1.6561 | 21.24 | −120.00 | 66.00 |
| S13 | | 5.3910 | 0.2590 | | | | |
| S14 | 7th Lens | 16.7910 | 2.4430 | 1.5365 | 56.5 | −95.70 | 60.00 |
| S15 | | 104.7380 | 2.3600 | | | | |
| S16 | 8th Lens | 15.1500 | 3.0000 | 1.5365 | 56.5 | −95.70 | 60.00 |
| S17 | | −563.9830 | 0.8000 | | | | |
| S18 | Filter | Infinity | 0.9000 | 1.5168 | 64.17 | 1.60 | 8.00 |
| S19 | | Infinity | 2.9000 | | | | |
| S20 | | Infinity | 0.4160 | — | — | — | — |
| S21 | Image Plane | Infinity | 0.0000 | — | — | — | — |

TABLE 10

| Surface No. | K | A | B | C | D |
|---|---|---|---|---|---|
| S3 | 0 | −3.251E−04 | 4.627E−06 | −4.455E−07 | 0.000E+00 |
| S4 | 0 | 3.111E−05 | −1.259E−06 | −4.666E−07 | 0.000E+00 |
| S6 | 0 | −2.315E−04 | 1.446E−07 | −1.644E−11 | 0.000E+00 |
| S7 | 0 | 1.404E−03 | −5.362E−05 | 1.061E−06 | 0.000E+00 |
| S8 | 0 | 1.240E−03 | −6.022E−05 | 2.013E−06 | −7.092E−08 |
| S9 | 0 | 7.535E−04 | −1.944E−06 | −4.650E−07 | 0.000E+00 |
| S10 | 0 | 3.036E−03 | −6.192E−05 | 4.366E−07 | −1.080E−09 |
| S11 | 0 | 2.533E−03 | −6.025E−05 | 1.086E−06 | 0.000E+00 |
| S12 | 0 | −2.836E−03 | 6.930E−05 | −5.260E−07 | 0.000E+00 |
| S13 | 0 | −3.616E−03 | 9.493E−05 | −4.043E−06 | 1.792E−07 |
| S14 | 0 | 3.546E−03 | −1.836E−04 | 7.701E−06 | −1.462E−07 |
| S15 | 0 | 8.907E−04 | 2.752E−05 | 2.259E−06 | −1.092E−07 |
| S16 | 0 | −5.090E−04 | 1.969E−05 | −1.973E−07 | 0.000E+00 |
| S17 | 0 | −3.169E−04 | 8.522E−07 | −8.011E−08 | 2.130E−09 |

Figure 21:
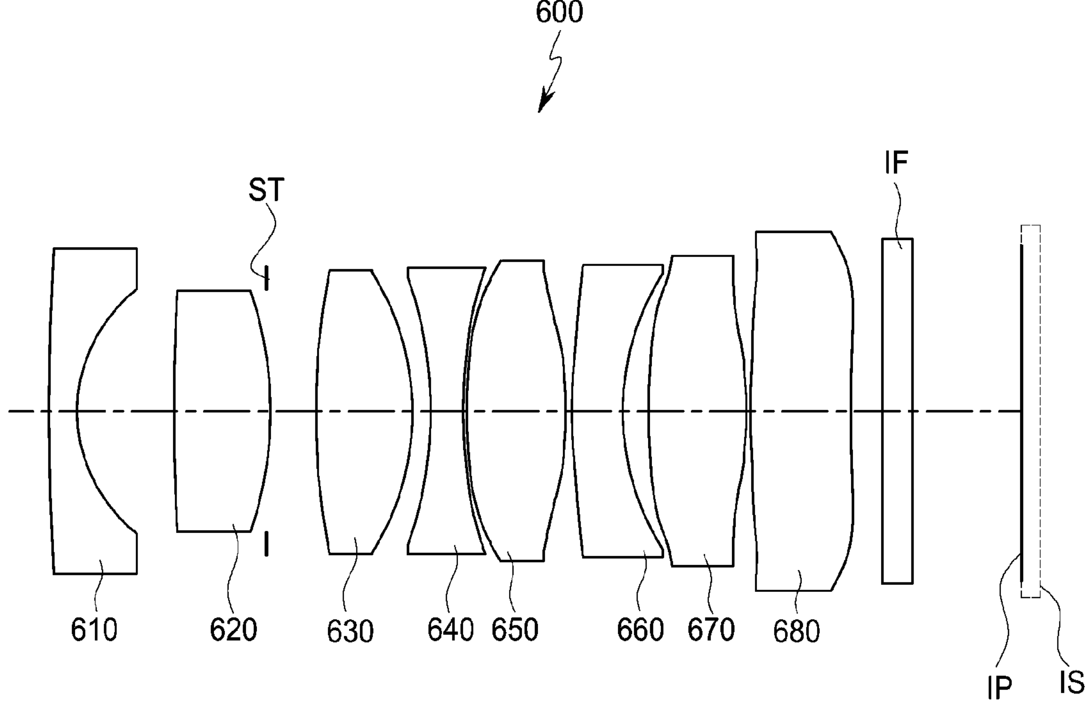
FIG. 21 is a configuration diagram of an imaging lens system according to a sixth embodiment of the present disclosure.

An imaging lens system according to a sixth embodiment will be described with reference to FIG. 21.

An imaging lens system 600 may include a first lens 610, a second lens 620, a third lens 630, a fourth lens 640, a fifth lens 650, a sixth lens 660, a seventh lens 670, and an eighth lens 680.

The first lens 610 may have negative refractive power, a convex object-side surface, and a concave image-side surface. The second lens 620 may have positive refractive power, a concave object-side surface, and a convex image-side surface. The third lens 630 may have positive refractive power, a convex object-side surface, and a convex image-side surface. The fourth lens 640 may have negative refractive power, a concave object-side surface, and a concave image-side surface. The fifth lens 650 may have positive refractive power, a convex object-side surface, and a convex image-side surface. The sixth lens 660 may have negative refractive power, a convex object-side surface, and a concave image-side surface. The seventh lens 670 may have positive refractive power, a convex object-side surface, and a convex image-side surface. The eighth lens 680 may have negative refractive power, a convex object-side surface, and a concave image-side surface.

The imaging lens system 600 may further include a stop ST, a filter IF, and an image plane IP. The stop ST may be disposed between the second lens 620 and the third lens 630. The image plane IP may be formed on an image sensor IS, and the filter IF may be disposed between the eighth lens 680 and the image plane IP.

Figure 22:
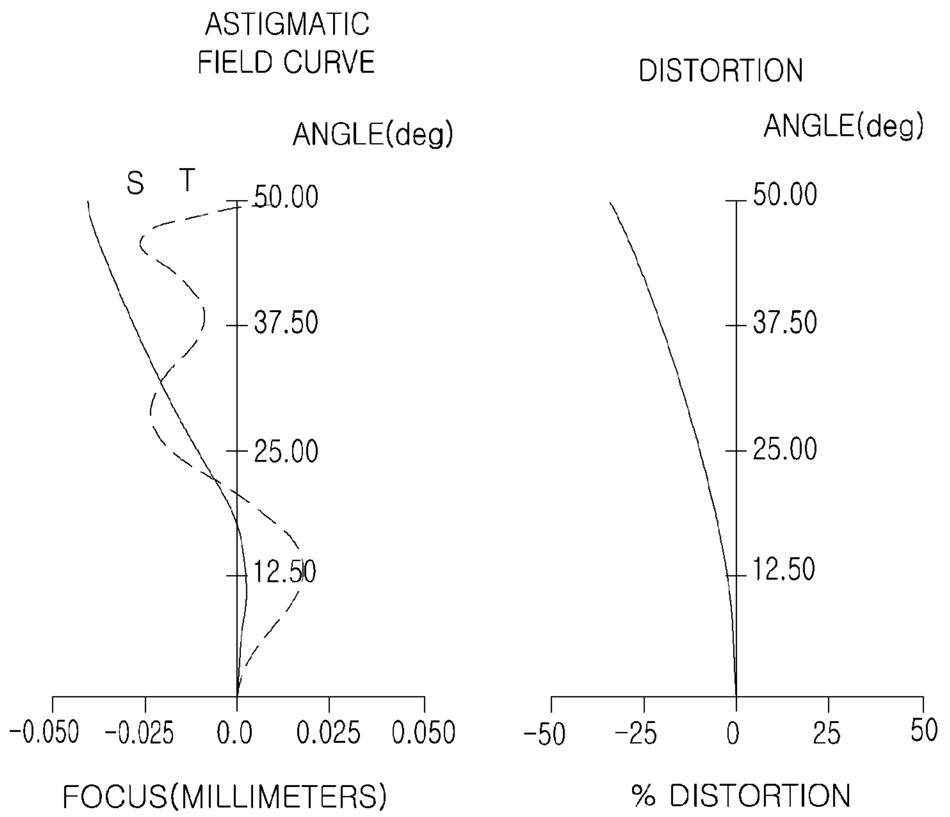
FIG. 22 is an aberration curve of the imaging lens system illustrated in FIG. 21.
Figure 23:
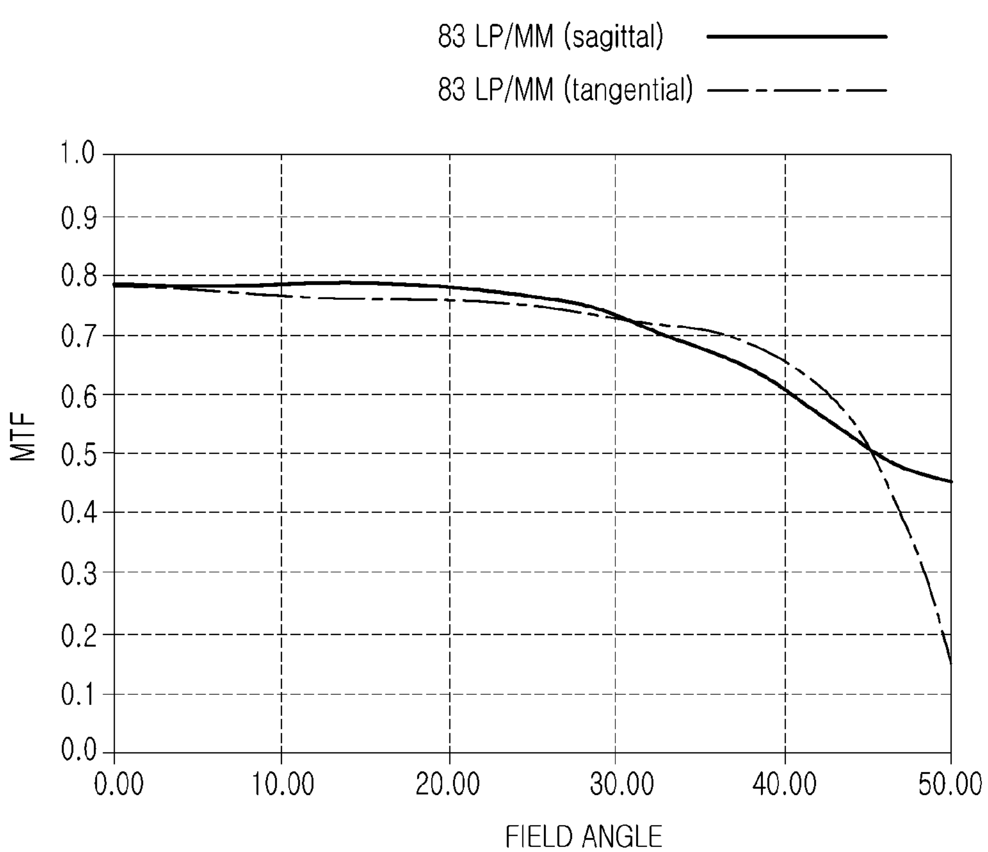
FIG. 23 is an MTF curve of the imaging lens system illustrated in FIG. 21.
Figure 24:
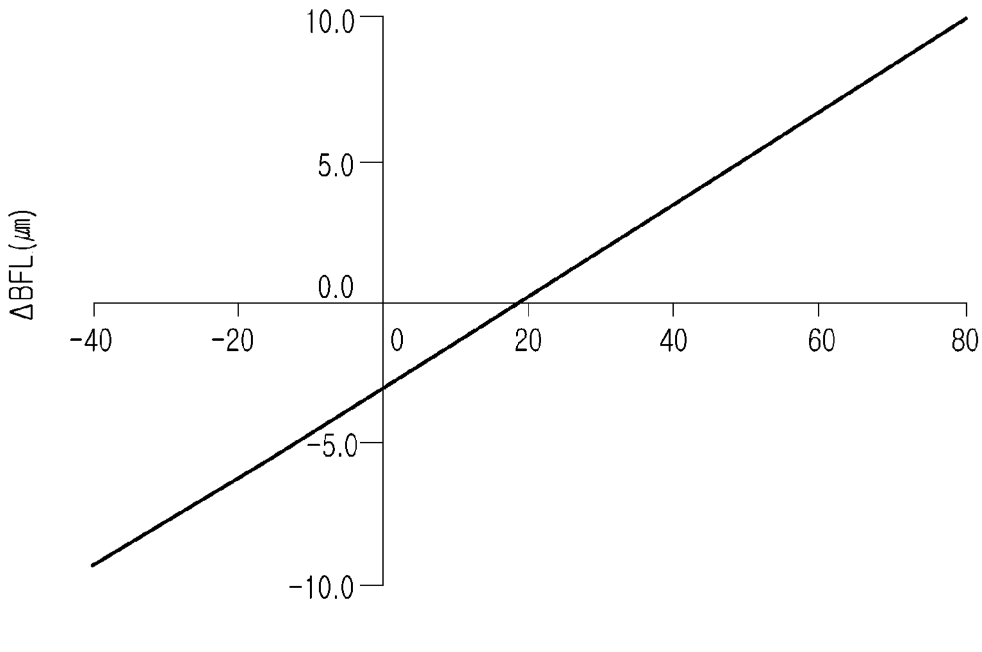
FIG. 24 is a curve illustrating BFL according to a change in temperature of the imaging lens system illustrated in FIG. 21.

FIG. 22 illustrates an aberration curve of an imaging lens system according to the present embodiment, and FIGS. 23 and 24 illustrate MTF characteristics and change amounts of a back focal length (ΔBFL: μm) according to a temperature in an imaging lens system according to the present embodiment.

Tables 11 and 12 illustrate lens characteristics and aspherical values of an imaging lens system according to the present embodiment.

TABLE 11

| Surface No. | Component | Curvature Radius | Thickness/Distance | Refractive Index | Abbe No. | DTn | CTE |
|---|---|---|---|---|---|---|---|
| S1 | 1st Lens | 100.0000 | 0.8000 | 1.7725 | 49.62 | 3.60 | 8.00 |
| S2 | | 4.3170 | 2.9030 | | | | |
| S3 | 2nd Lens | −802.3720 | 3.0000 | 1.6561 | 21.24 | −120.00 | 66.00 |
| S4 | | −11.3760 | −0.2340 | | | | |
| S5 | Stop | Infinity | 1.4460 | — | — | — | — |
| S6 | 3rd Lens | 22.2730 | 3.0000 | 1.7421 | 49.25 | 7.50 | 6.00 |
| S7 | | −7.3720 | 0.5000 | | | | |
| S8 | 4th Lens | −11.5340 | 1.0100 | 1.6561 | 21.24 | −120.00 | 66.00 |
| S9 | | 16.5720 | 0.1030 | | | | |
| S10 | 5th Lens | 100.0000 | 3.0000 | 1.5365 | 56.5 | −95.70 | 60.00 |
| S11 | | −7.2060 | 0.1050 | | | | |
| S12 | 6th Lens | 9.4820 | 1.5360 | 1.6561 | 21.24 | −120.00 | 66.00 |
| S13 | | 4.9390 | 0.7930 | | | | |
| S14 | 7th Lens | 29.7260 | 2.9250 | 1.5365 | 56.5 | −95.70 | 60.00 |
| S15 | | −10.1890 | 0.1390 | | | | |
| S16 | 8th Lens | 52.6550 | 3.0000 | 1.5365 | 56.5 | −95.70 | 60.00 |
| S17 | | 30.5920 | 0.8000 | | | | |
| S18 | Filter | Infinity | 0.9000 | 1.5168 | 64.17 | 1.60 | 8.00 |
| S19 | | Infinity | 2.9000 | | | | |
| S20 | | Infinity | 0.8470 | — | — | — | — |
| S21 | Image Plane | Infinity | 0.0000 | — | — | — | — |

TABLE 12

| Surface No. | K | A | B | C | D |
|---|---|---|---|---|---|
| S3 | 0 | −4.252E−05 | −1.403E−05 | 1.828E−06 | −4.426E−08 |
| S4 | 0 | 7.289E−05 | −1.410E−05 | 1.820E−06 | −6.845E−08 |
| S6 | 0 | −3.556E−04 | 1.563E−05 | −8.294E−08 | −6.856E−10 |
| S7 | 0 | 1.310E−03 | −8.120E−05 | 3.291E−06 | −4.124E−08 |
| S8 | 0 | 1.037E−03 | −1.184E−04 | 5.996E−06 | −1.127E−07 |
| S9 | 0 | 5.550E−04 | −1.132E−05 | 2.727E−07 | −2.295E−08 |
| S10 | 0 | 4.008E−03 | −1.155E−04 | 1.231E−06 | 1.676E−08 |
| S11 | 0 | 3.270E−03 | −1.130E−04 | 3.627E−06 | −3.107E−08 |
| S12 | 0 | −4.081E−03 | 1.417E−04 | 3.883E−07 | −8.635E−08 |
| S13 | 0 | −6.718E−03 | 3.487E−04 | −1.491E−05 | 5.784E−07 |
| S14 | 0 | 2.009E−03 | −1.310E−04 | 7.935E−06 | −2.080E−07 |
| S15 | 0 | 2.177E−03 | −5.898E−05 | 3.791E−06 | −1.061E−07 |
| S16 | 0 | 1.531E−04 | −3.789E−05 | 3.093E−06 | −8.165E−08 |
| S17 | 0 | −1.412E−03 | 2.123E−05 | −4.607E−07 | −2.773E−09 |

Tables 13 and 14 show optical characteristic values and conditional expression values of the imaging lens system according to the first to sixth embodiments.

TABLE 13

| | 1st Embodiment | 2nd Embodiment | 3rd Embodiment | 4th Embodiment | 5th Embodiment | 6th Embodiment |
|---|---|---|---|---|---|---|
| f1 | −5.7508 | −5.8627 | −5.7694 | −5.7046 | −5.6705 | −5.8618 |
| f2 | 17.0414 | 16.9772 | 15.1335 | 14.7467 | 17.2295 | 17.5618 |
| f3 | 7.6428 | 7.5722 | 7.5068 | 7.5230 | 7.5408 | 7.7999 |
| f4 | −10.0851 | −11.0182 | −10.7515 | −10.9355 | −10.2816 | −10.2199 |
| f5 | 12.4064 | 14.1135 | 14.5808 | 14.4417 | 12.8444 | 12.6523 |
| f6 | −21.6356 | −20.7074 | −20.1743 | −19.5792 | −19.9591 | −18.1419 |
| f7 | 15.9993 | 14.5220 | 14.6566 | 14.6713 | 36.9146 | 14.5151 |

TABLE 13-continued

| | 1st Embodiment | 2nd Embodiment | 3rd Embodiment | 4th Embodiment | 5th Embodiment | 6th Embodiment |
|---|---|---|---|---|---|---|
| f8 | −138.0612 | −91.0254 | −89.7751 | −72.8362 | 27.5497 | −142.8691 |
| TTL | 29.1800 | 29.5380 | 29.7380 | 29.8110 | 29.8160 | 29.4730 |
| F | 6.2571 | 6.2574 | 6.2528 | 6.2575 | 6.2624 | 6.2309 |
| HFOV | 50.7500 | 50.0000 | 50.0000 | 50.0000 | 50.0000 | 50.0000 |

TABLE 14

| Conditional Expression Values | 1st Embodiment | 2nd Embodiment | 3rd Embodiment | 4th Embodiment | 5th Embodiment | 6th Embodiment |
|---|---|---|---|---|---|---|
| \|L3DTn\| | 7.5000 | 7.5000 | 7.5000 | 7.5000 | 7.5000 | 7.5000 |
| f3/f | 1.2215 | 1.2101 | 1.2006 | 1.2022 | 1.2041 | 1.2518 |
| f1/f3 | −0.7524 | −0.7742 | −0.7686 | −0.7583 | −0.7520 | −0.7515 |
| f2/f3 | 2.2297 | 2.2420 | 2.0160 | 1.9602 | 2.2848 | 2.2516 |
| f4/f3 | −1.3196 | −1.4551 | −1.4322 | −1.4536 | −1.3635 | −1.3103 |
| f5/f3 | 1.6233 | 1.8639 | 1.9424 | 1.9197 | 1.7033 | 1.6221 |
| f6/f3 | −2.8308 | −2.7346 | −2.6875 | −2.6026 | −2.6468 | −2.3259 |
| f7/f3 | 2.0934 | 1.9178 | 1.9524 | 1.9502 | 4.8953 | 1.8609 |
| f8/(f3 + f5 + f7) | −3.8299 | −2.5140 | −2.4432 | −1.9881 | 0.4808 | −4.0858 |
| (f1 + f2)/(f3 + f4) | −4.6229 | −3.2254 | −2.8860 | −2.6497 | −4.2174 | −4.8346 |
| L1DTn/L3DTn | 0.4800 | 0.4800 | 0.4800 | 0.4800 | 0.4800 | 0.4800 |
| LFDTnS/LRDTnS | 0.2240 | 0.2240 | 0.2240 | 0.2240 | 0.2307 | 0.2240 |
| (L1DTn + L2TDTn)/(L3DTn + L4DTn) | 1.0347 | 1.0347 | 1.0347 | 1.0347 | 1.1938 | 1.0347 |
| (L4DTn + L5TDTn)/(L6DTn + L7DTn) | 1.0000 | 1.0000 | 1.0000 | 1.0000 | 0.9305 | 1.0000 |

The present disclosure may provide an imaging lens system capable of implementing constant optical characteristics (focal length) in a wide temperature range from a high-temperature environment of 80° C. to a low-temperature environment of −40° C.

An aspect of the present disclosure is to solve the above problems and to provide an imaging lens system capable of achieving high resolution while suppressing a focus change magnitude due to rapid temperature deviation to 10 μm or less by using (mixing) a plastic lens and a glass lens.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An imaging lens system comprising:

a first lens, a second lens, a third lens, a fourth lens, a fifth lens, a sixth lens, a seventh lens, and an eighth lens, sequentially arranged from an object side, wherein each of the second lens and the third lens has a positive refractive power, wherein the imaging lens system satisfies conditional expressions:

$$|L3DTn| < 10.0\ [10-6/°\ \mathrm{C.}] \text{ and } 0.42 < L1DTn/L3DTn < 0.52,$$

where L1DTn is a change rate in refractive index according to a change in temperature of the first lens, and L3DTn is a change rate in refractive index according to a change in temperature of the third lens.

2. The imaging lens system of claim 1, wherein the imaging lens system satisfies conditional expression:

$$f3/f < 1.30,$$

where f is a focal length of the imaging lens system, and f3 is a focal length of the third lens.

3. The imaging lens system of claim 1, wherein the first lens comprises a concave image-side surface.

4. The imaging lens system of claim 1, wherein the second lens comprises a convex image-side surface.

5. The imaging lens system of claim 1, wherein the third lens comprises a convex image-side surface.

6. The imaging lens system of claim 1, wherein the fourth lens comprises a concave image-side surface.

7. The imaging lens system of claim 1, wherein the fifth lens comprises a convex image-side surface.

8. The imaging lens system of claim 1, wherein the sixth lens comprises a concave image-side surface.

9. The imaging lens system of claim 1, wherein the seventh lens comprises a convex object-side surface.

10. The imaging lens system of claim 1, wherein the eighth lens comprises a convex object-side surface.

11. An imaging lens system comprising:

a first lens, a second lens, a third lens, a fourth lens, a fifth lens, a sixth lens, a seventh lens, and an eighth lens, sequentially arranged from an object side, wherein the second lens has a convex image-side surface, wherein the imaging lens system satisfies conditional expressions:

$$1.16 < f3/f < 1.26 \text{ and } 0.42 < L1DTn/L3DTn < 0.52,$$

and $0.42<L1DTn/L3DTn<0.52$, where f is a focal length of the imaging lens system, and f3 is a focal length of the third lens, L1DTn is a change rate in refractive index according to a change in temperature of the first lens, and L3DTn is a change rate in refractive index according to a change in temperature of the third lens.

12. The imaging lens system of claim 11, wherein the imaging lens system satisfies the conditional expression:

$$-1.0 < f1/f3 < -0.60,$$

where f1 is a focal length of the first lens.

13. The imaging lens system of claim 11, wherein the imaging lens system satisfies the conditional expression:

$$1.80 < f2/f3 < 2.60,$$

where f2 is a focal length of the second lens.

14. The imaging lens system of claim 11, wherein the imaging lens system satisfies the conditional expression:

$$-5.0 < (f1 + f2)/(f3 + f4) < -2.0,$$

where f1 is a focal length of the first lens, f2 is a focal length of the second lens, and f4 is a focal length of the fourth lens.

15. The imaging lens system of claim 11, wherein the imaging lens system satisfies the conditional expression:

$$0.92 < (L4DTn + L5DTn)/(L6DTn + L7DTn) < 1.20,$$

where L4DTn is a change rate in refractive index according to a change in temperature of the fourth lens, L5DTn is a change rate in refractive index according to a change in temperature of the fifth lens, L6DTn is a change rate in refractive index according to a change in temperature of the sixth lens, and L7DTn is a change rate in refractive index according to a change in temperature of the seventh lens.

16. An imaging lens system comprising:

a first lens, a second lens, a third lens, a fourth lens, a fifth lens, a sixth lens, a seventh lens, and an eighth lens, sequentially arranged from an object side, wherein a material of the first to third lenses is different from a material of the fourth to eighth lenses, wherein each of the second lens and the third lens has a positive refractive power, wherein the imaging lens system satisfies conditional expressions:

$$|L3DTn| < 10.0\,[10 - 6/°\,\text{C.}] \text{ and } 0.42 < L1DTn/L3DTn < 0.52,$$

and $0.42<L1DTn/L3DTn<0.52$ where L1DTn is a change rate in refractive index according to a change in temperature of the first lens, and L3DTn is a change rate in refractive index according to a change in temperature of the third lens.

17. The imaging lens system of claim 16, wherein the material of the first to third lenses is glass.

18. The imaging lens system of claim 16, wherein the material of the fourth to eighth lenses is plastic.

19. The imaging lens system of claim 16, wherein the material of the first to third lenses is glass, and the material of the fourth to eighth lenses is plastic.

* * * * *